United States Patent
Sasai et al.

(10) Patent No.: US 6,271,942 B1
(45) Date of Patent: Aug. 7, 2001

(54) OPTICAL TRANSMISSION DEVICE AND SYSTEM

(75) Inventors: Hiroyuki Sasai, Katano; Hiroaki Yamamoto, Higashiosaka; Kuniaki Utsumi, Sanda; Katsuyuki Fujito, Higashiosaka; Yutaka Fuke, Yokohama, all of (JP)

(73) Assignees: Matsushita Electric Industrial Co., Ltd., Osaka-fu; NTT DoCoMo, Inc., Tokyo, both of (JP)

( * ) Notice: Subject to any disclaimer, the term of this patent is extended or adjusted under 35 U.S.C. 154(b) by 0 days.

(21) Appl. No.: 08/978,820

(22) Filed: Nov. 26, 1997

(30) Foreign Application Priority Data

Nov. 26, 1996 (JP) .................................... 8-320268
Nov. 29, 1996 (JP) .................................... 8-320267

(51) Int. Cl.[7] .................................................. H04J 14/02
(52) U.S. Cl. ........................................ 359/124; 359/133
(58) Field of Search ........................... 359/124, 125, 359/133, 162, 181, 182

(56) References Cited

U.S. PATENT DOCUMENTS

| | | | |
|---|---|---|---|
| 4,893,300 | * 1/1990 | Carlin et al. | 370/3 |
| 5,020,049 | * 5/1991 | Bodeep et al. | 370/3 |
| 5,373,385 | 12/1994 | Darcie et al. | 359/162 |
| 5,430,569 | 7/1995 | Blauvelt et al. | 35/162 |
| 5,432,632 | * 7/1995 | Watanabe | 359/191 |
| 5,532,865 | 7/1996 | Utsumi et al. | 359/189 |
| 5,850,303 | * 12/1998 | Yamamoto et al. | 359/133 |

FOREIGN PATENT DOCUMENTS 5-291671   11/1993   (JP) .
6-177840   6/1994    (JP) .

* cited by examiner

*Primary Examiner*—Leslie Pascal
*Assistant Examiner*—Dalzid Singh
(74) *Attorney, Agent, or Firm*—Wenderoth, Lind & Ponack, L.L.P.

(57) ABSTRACT

An oscillator outputs an additional signal with a frequency which is higher than a frequency corresponding to a bandwidth of a frequency band allotted to an electrical signal to be transmitted and lower than a half of a lowest frequency of a frequency band allotted to the electrical signal to be transmitted. Thereby, if a second order intermodulation distortion between the additional signal and the electrical signal to be transmitted occurs, a frequency where distortion occurs is outside all of the frequency bands allotted to the electrical signal to be transmitted, and the occurring second order intermodulation distortion does not affect the electrical signal to be transmitted. Further, if the second order intermodulation distortion of the additional signal occurs, the frequency where distortion occurs is outside all of the frequency bands allotted to the electrical signal to be transmitted, and the occurring second order intermodulation distortion does not affect the electrical signal to be transmitted. Not only noise and distortions caused by reflected optical signal but also OBI noise can be reduced by using the additional signal.

44 Claims, 18 Drawing Sheets

OPTICAL TRANSMISSION DEVICE AND SYSTEM

BACKGROUND OF THE INVENTION

1. Field of the Invention

The present invention relates to analog optical transmission devices by an optical SCM method, and more specifically to a device capable of suppressing noise or distortion which increases due to reflected light, and noise or distortion which increases due to reflected return light to a light source and unstableness of the light source. Further, it relates to an analog optical transmission system capable of reducing optical beat interference noise which causes a problem when optical signals from a plurality of light sources are received in totality.

2. Description of the Background Art

An optical SCM (Sub-Carrier Multiplexing) transmission method is a method of converting a frequency-modulated electrical signal to be transmitted into laser light which is intensity-modulated by the signal and then transmitting the light, not requiring A/D and D/A converters unlike digital transmission by on/off of light and further having a characteristic of an extremely broad band and low loss compared to the conventional transmission method using a coaxial cable. Therefore, in recent years, its practical use has been highly expected.

In this optical SCM transmission method, the following problems are known.

Firstly, when multiple reflected light occurs in an optical fiber, noise and distortion increase to deteriorate a transmission characteristic.

Secondly, when reflected light is coupled to a light source, the state of the light source becomes unstable to increase noise and distortion.

Thirdly, when optical signals outputted from a plurality of light sources are received in totality, if wavelengths of optical signals are close to each other, optical beat interference (OBI) noise occurs to deteriorate the transmission characteristic.

The optical signal is reflected in an end surface of an optical component, a connector end surface of the optical fiber, etc. Or, Rayleigh scattering in the optical fiber, etc., also causes reflected light.

Among the above three problems, as an example of a device of suppressing the first transmission characteristic deterioration, an analog optical transmission device and an optical fiber amplifier are disclosed in Japanese Patent Laying-Open No. 5-291671.

FIG. 17 is a block diagram showing the structure of the conventional analog optical transmission device disclosed in Japanese Patent Laying-Open No. 5-291671. The device in FIG. 17 includes a multiplex portion 501, an adding portion 502, a picture signal input terminal 503, amplifiers 504 and 508, a semiconductor laser device 505, an optical fiber 506, a photo-receptive device 507, a picture signal output terminal 509, and optical connectors 510 and 511.

Analog electrical signals of N channels (ch1 to N) are RF-multiplexed in the multiplex portion 501, further in the additional portion 502 a pilot signal is added thereto, and then inputted to the picture signal input terminal 503. The electrical signal inputted in the picture signal input terminal 503 is amplified in the amplifier 504 and then converted into an optical signal by the semiconductor laser device 505. The optical signal obtained by the semiconductor laser device 505 is transmitted through the optical fiber 506 and the optical connectors 510 and 511 to the receiving side. The transmitted optical signal is again converted into an electrical signal in the photo-receptive device 507, further amplified in the amplifier 508, and then outputted from the picture signal output terminal 509.

In the above operation, part of the optical signal outputted from the semiconductor laser device 505 is reflected in the optical connectors 510 and 511 or subjected to Rayleigh scattering in the optical fiber 506. Further, part of reflected light is re-reflected, causing multiple reflected light which proceeds in the same direction as that of the optical signal. Generally, in the semiconductor laser, since wavelength chirping exists associated with electrical-optical conversion, the reflected light which proceeds in the same direction interferes with the optical signal at the time of optical-electrical conversion to cause unfavorable electrical intensity modulation, resulting in interference noise. Therefore, as it is, it is expected that noise or distortion will occur in the electrical signal outputted from the picture signal output terminal 509. For this reason, the device in FIG. 17 adds a pilot signal to the electrical signal to be transmitted, converts the electrical signal into an optical signal and then transmits the optical signal, thereby dispersing the power of the interference noise over a wide frequency band. This reduces the power of the interference noise in the transmission frequency band, resulting in reduction in noise or distortion by reflected light.

Also disclosed in Japanese Patent Laying-Open No. 5-291671 there are conditions in which the frequency of the pilot signal is not more than the frequency corresponding to the spectrum line width of the semiconductor laser. It is expressed in FIG. 17 that adding a pilot signal which satisfies the conditions sufficiently reduces noise or distortion by reflected light which occurs in the optical fiber 506 and the optical connectors 510 and 511. However, in the device of FIG. 17, adding a pilot signal newly causes a second order intermodulation distortion (hereinafter referred to as IM2) between the RF-modulated analog electrical signal and the pilot signal.

Furthermore, a structure like that of Japanese Patent Laying-Open No. 5-291671 is used in U.S. Pat. No. 5,373,385. In this patent, the frequency of the additional signal is defined to be outside the band of the signal to be transmitted. Therefore, although the additional signal does not directly have an adverse effect on the signal to be transmitted, as is the same in Japanese Patent Laying-Open No. 5-291671, IM2 newly occurs to have an adverse effect on the signal to be transmitted.

On the other hand, U.S. Pat. No. 5,430,569 discloses a structure capable of reducing IM2 which newly occurs by an additional signal. In this patent, when IM2 occurs in the band allotted for transmission of the signal to be transmitted, a predistorter is used for reduction in its effect. When IM2 occurs only outside the band, the predistorter is omitted from the structure.

As a method of suppressing the second transmission characteristic deterioration, a method of inserting an optical isolator between a light source and an optical fiber so as not to couple reflected light to the light source is generally adapted.

As a method of suppressing the third transmission characteristic deterioration, Japanese Patent Laying-Open No. 6-177840 discloses an optical communications method of suppressing OBI noise. FIG. 18 is a block diagram showing the structure of the conventional optical transmission system using the optical transmission method described in Japanese Patent Laying-Open No. 6-177840. The system in FIG. 18 includes transmitting terminals 600 to 602, receiving terminals 603 and 604, optical fibers 605 and 606, and an optical star coupler 607. Each of the transmitting terminals 600 to 602 has oscillators $608_1$ to $608_3$, electrical modulators $609_1$ to $609_3$, and optical modulators $610_1$ to $610_3$. The receiving terminal 603 includes an optical demodulator 611, frequency selective filters $612_1$ to $612_3$, electrical demodulators $613_1$ to $613_3$, and oscillators $614_1$ to $614_3$. The receiving terminal 604 includes an optical demodulator 615, frequency selective filters $616_1$ to $616_3$, electrical demodulators $617_1$ to $617_3$, and oscillators $618_1$ to $618_3$.

Each of the oscillators $608_1$ to $608_3$ (f1 to 3 shown in the drawing), $614_1$ to $614_3$, and $618_1$ to $618_3$ outputs a sub-carrier with the frequency of f1 to f3 (electrical signal), respectively. Each of the electrical modulators $609_1$ to $609_3$ modulates the sub-carrier by the input signal. Each of the optical modulators $610_1$ to $610_3$ modulates a main carrier (an optical signal) with the wavelength of $\lambda 1$ to $\lambda 3$ by the sub-carrier, respectively. The optical star coupler 607 multiplexes the main carriers and divides the multiplexed carriers. Each of the optical demodulators 611 and 615 demodulates the main carrier. Each of the frequency selective filters $612_1$ to $612_3$ and $616_1$ to $616_3$ selects the sub-carrier with the frequency of f1 to f3 from the optical demodulator output, respectively. Each of the electrical demodulators $613_1$ to $613_3$ and $617_1$ to $617_3$ demodulates the sub-carrier.

Described below is operation of the system in FIG. 18.

When the oscillators $608_1$ to $608_3$ output the sub-carriers with the frequencies of f1 to f3, respectively, the electrical modulators $609_1$ to $609_3$ modulate the sub-carriers by the input signals (1) to (3). Next, the optical modulators $610_1$ to $610_3$ intensity-modulate the main carriers (optical signals) with the wavelengths of $\lambda 1$ to $\lambda 3$ by the modulated sub-carriers, respectively. The modulated main carriers are each transmitted through the optical fibers 605 to the optical star coupler 607, in which they are multiplexed and divided, and then transmitted through the optical fibers 606 to the receiving terminals 603 and 604. In the receiving terminals 603 and 604, each of the optical demodulators 611 and 615 respectively demodulates the transmitted main carriers, and the frequency selective filters $612_1$ to $612_3$ and $616_1$ to $616_3$ respectively select the sub-carriers with the frequencies of f1 to 3 from the each optical demodulator output. Then, when the electrical demodulators $613_1$ to $613_3$ and $617_1$ to $617_3$ demodulate the selected sub-carriers using the sub-carriers outputted from the oscillators $614_1$ to $614_3$ and $618_1$ to $618_3$, respectively, the input signals (1) to (3) can be obtained.

In the above operation, at the time of optical demodulation, OBI noise is caused when wavelengths of two main carriers are adjacent to each other. Therefore, the temperature or the bias current of the optical sources included in the optical modulators $610_1$ to $610_3$ is changed to periodically change the wavelengths $\lambda 1$ to $\lambda 3$ of the main carriers independently for each of the transmitting terminals 600 to 602. This can make the time when the frequency of OBI noise matches to the sub-carrier frequency extremely short, thereby decreasing the effect of the OBI noise. For example, in analog signal transmission for CATV, if the time when the frequency of OBI noise matches to the sub-carrier frequency is shortened in the above manner, the OBI noise hardly affects the receiving condition. Especially, when the modulation signal is an analog television signal in the cable television system, if the OBI noise effects on the analog signal momentarily, it cannot be recognized on a TV screen.

Further, disclosed in U.S. Pat. No. 5,532,865 is an optical communications method capable of suppressing beat interference using another method. The method is structured such that an inputted optical signal and another optical signal from an optical source are coupled and the obtained optical signal is once branched and one of the branched signal is then outputted. The other of the branched optical signals is converted into an electrical signal to examine whether the frequency of OBI noise is adjacent to the sub-carrier frequency, and if adjacent, the wavelength of the optical source is changed to change the frequency of OBI noise, thereby removing the effect of the OBI noise.

However, in each of the above shown conventional examples, the following problems still remain.

That is, for the first problem, in both Japanese Patent Laying-Open No. 5-291671 and U.S. Pat. No. 5,430,569, there is a possibility that IM2 may occur in the transmission band to deteriorate the transmission characteristic. Further, in U.S. Pat. No. 5,373,385, although IM2 in the transmission band can be reduced, a predistorter therefor is newly required. For the predistorter, it is required to accurately perform adjustment of distortion power for compensation and an amount of phases, and this adjusting operation is not easy.

For the second problem, in the conventional method, an expensive optical isolator is provided to increase the cost of the device. Additionally, the optical isolator is generally installed in a distributed feedback semiconductor laser (DFB-LD) module, and conventionally in most cases, for the device performing optical SCM transmission, this expensive DFB-LD has been adapted as the optical source. On the other hand, a Fabry-Perot-type semiconductor laser (FP-LD) module is generally used for digital optical communications, very low-priced but not containing an optical isolator. If the second transmission characteristic can be suppressed without an optical isolator, the price of the device can be made extremely low.

For the third problem, the method shown in Japanese Patent Laying-Open No. 6-177840 has a possibility of decreasing the effect of the OBI noise as far as a picture signal is transmitted. However, for example, when the modulation signal is a digital modulation signal, momentary effect of noise causes a burst error of the digital signal. In this case, even with error correction, there is a possibility that the burst error cannot be corrected sufficiently. In addition, also when a picture signal is transmitted, intermodulation distortion occurs between the sub-carrier changing the wavelength of the main carrier of the optical signal and the sub-carrier for transmitting the picture signal.

Further, in Japanese Patent Laying-Open No. 6-177840, the OBI noise cannot necessarily be reduced sufficiently. This is because the following reason: the reducing effect of the OBI noise is due to a chirping characteristic of the semiconductor laser, substantially depending on not only the frequency of the additional signal to be added to the semiconductor laser but also its optical modulation index and bias current value. Therefore, in order to sufficiently reduce the OBI noise, it is necessary to consider these parameters altogether. However, in Japanese Patent Laying-Open No. 6-177840, the amount of reduction in the OBI noise is not quantitatively evaluated as such, and therefore the OBI noise cannot be necessarily reduced sufficiently.

Furthermore, in U.S. Pat. No. 5,532,865, in order to change the wavelength of the optical source, for example, it is required to change the temperature or the bias current of the optical source. When the bias current is changed, the optical modulation index, which is an important parameter of the optical SCM transmission system, is also changed, thereby causing the danger of undesirably inviting deterioration of a distortion characteristic and deterioration of a C/N characteristic in addition to the OBI interference. On the other hand, in order to change temperature, it is necessary to install a part therefor. In addition to the description as to changing temperature, in general, the FP-LD module does not have a temperature control function, and when it is used as an optical source for the optical SCM transmission, a part for temperature control must be installed.

SUMMARY OF THE INVENTION

Therefore, a first object of the present invention is to provide an optical transmission device capable of sufficiently suppressing transmission characteristic deterioration which is caused by reflected light the time of transmission in the optical SCM method with a simple structure at low cost. Further, a second object of the present invention is to provide an optical transmission device capable of sufficiently suppressing transmission characteristic deterioration which is caused by reflected return light to a light source at the time of transmission in the optical SCM method with a simple structure at low cost. Further, a third object of the present invention is to provide an optical transmission system capable of sufficiently suppressing transmission characteristic deterioration which is caused by OBI noise which occurs when a main station photo-receives optical signals transmitted from a plurality of sub-stations in a totality at the time of multiple-to-one transmission in the optical SCM method.

The present invention has the following features to achieve the objects above.

A first aspect of the present invention is directed to an optical transmission device for converting an electrical signal into an optical signal directly intensity-modulated by the electrical signal and then transmitting the optical signal, comprising:

an oscillator for outputting an additional signal, a multiplexing portion for multiplexing the electrical signal to be transmitted and the additional signal outputted from the oscillator, a DC current source for outputting a DC bias current, a semiconductor laser for outputting an optical signal directly intensity-modulated by a signal obtained by mixing an electrical signal obtained by multiplexing by the multiplexing portion and the DC bias current outputted from the DC current source, an optical transmission path for transmitting the optical signal outputted from the semiconductor laser, and an optical-electrical converting portion for converting the optical signal transmitted through the optical transmission path into an electrical signal, wherein the oscillator outputs the additional signal with a frequency which is higher than a frequency corresponding to a widest bandwidth of a frequency band allotted to the electrical signal to be transmitted and lower than a half of a lowest frequency of a frequency band allotted to the electrical signal to be transmitted.

As described above, in accordance with the first aspect, the semiconductor laser is modulated by the additional signal. The semiconductor laser is frequency-modulated simultaneously with being directly intensity-modulated, thereby being subjected to frequency modulation by the additional signal. The spectrum of the frequency-modulated optical signal is expanded in a wide band, and thereby even if reflected light or reflected return light to the semiconductor laser occurs, transmission characteristic deterioration due to them is suppressed. At this time, the frequency range of the additional signal is set to be higher than the frequency corresponding to the widest bandwidth of the frequency band allotted to the electrical signal to be transmitted, and thereby even if second order intermodulation distortion between the additional signal and the electrical signal to be transmitted occurs due to nonlinearity of the semiconductor laser, etc., the frequency where distortion occurs is outside all of the frequency bands allotted to the electrical signal to be transmitted. Therefore, the second order intermodulation distortion does not affect the electrical signal to be transmitted. Furthermore, the frequency range of the additional signal is set to be lower than a half of the lowest frequency of the frequency band allotted to the electrical signal to be transmitted, and thereby even if the second order intermodulation distortion between the additional signal and the electrical signal to be transmitted occurs due to nonlinearity of the semiconductor laser, etc., the frequency where distortion occurs is outside all of the frequency bands allotted to the electrical signal to be transmitted. Therefore, the second order intermodulation distortion also does not affect the electrical signal to be transmitted. In addition, since the transmission characteristic deterioration due to the reflected return light can be suppressed, a semiconductor laser module not containing an optical isolator can be used as a light source.

According to a second aspect, in the first aspect, the semiconductor laser is a Fabry-Perot-type semiconductor laser.

As described above, in accordance with the second aspect, the price of the device can be reduced by using the Fabry-Perot-type semiconductor laser.

According to a third aspect, in the second aspect, the additional signal outputted from the oscillator is modulated by any data.

As described above, in accordance with the third aspect, by the additional signal, for example, data for monitoring, etc., can be transmitted.

According to a fourth aspect, in the third aspect, the Fabry-Perot-type semiconductor laser has such a chip structure that an active layer having an amplifying function of the optical signal and a spot size converting portion for narrowing an angle of emission of the outputted optical signal are formed on a same substrate.

As described above, in accordance with the fourth aspect, the optical signal emitted from the LD chip can be efficiently coupled to the optical fiber.

According to a fifth aspect, in the fourth aspect, the electrical signal to be transmitted is a signal obtained by frequency-division-multiplexing one or more radio signals for mobile communications, one or more contiguous frequency bands are allotted to one or more electrical signals to be transmitted, and the oscillator outputs an additional signal with a frequency which is higher than a frequency corresponding to a bandwidth of a widest frequency band among the one or more contiguous frequency bands and lower than a half of a lowest frequency among the one or more contiguous frequency bands.

As described above, in accordance with the fifth aspect, transmission of a radio signal for mobile communications of high quality can be achieved.

According to a sixth aspect, in the fifth aspect, an electrical signal transmitted using at least one frequency band among the one or more contiguous frequency bands is a code division multiplex signal, and the oscillator outputs an additional signal with a frequency which is higher than a frequency corresponding to a widest frequency band among all of the one or more contiguous frequency bands except the frequency band allotted to the code division multiplex signal and lower than a half of the lowest frequency of the one or more contiguous frequency bands.

As described above, in accordance with the sixth aspect, neither of the second order intermodulation distortion nor second order harmonic distortion occurs in the bands except the frequency band allotted to the code-division-multiplexed electrical signal.

According to a seventh aspect, in the sixth aspect, the optical transmission path includes one or more optical fibers, and a position of an emission end surface of the Fabry-Perot-type semiconductor laser and that of an end surface of the optical fiber coupled thereto are set not to be parallel to each other.

As described above, in accordance with the seventh aspect, the amount of reflected return light to the semiconductor laser can be reduced, resulting in further reduction in a value of the lowest level required for the additional signal.

According to an eighth aspect, in the seventh aspect, the device further comprises an additional signal level adjusting portion for adjusting a level of the additional signal outputted from the oscillator, and the additional signal level adjusting portion adjusts the level of the additional signal outputted from the oscillator so that a frequency modulation index $\beta$ of the optical signal outputted from the semiconductor laser can satisfy a conditional equation $\beta \geq (2/\pi) \cdot 10^{P/10}$ (where $\pi$ is the ratio of the circumference of a circle to its diameter) for reducing noise or distortion which occurs in this optical transmission by at least P decibels.

As described above, in accordance with the eighth aspect, distortion or noise due to reflected light and reflected return light can be reduced by a desired amount.

According to a ninth aspect, in the eighth aspect, the additional signal level adjusting portion adjusts the level of the additional signal so that the frequency modulation index $\beta$ can satisfy a conditional equation $\beta \geq 1.7$.

As described above, in accordance with the ninth aspect, distortion or noise due to reflected light and reflected return light can be reduced by at least Pmin (the smallest value among a plurality of minimum values of an amount of reduction in distortion P).

According to a tenth aspect, in the seventh aspect, when optical modulation indexes allotted to the plurality of the electrical signals to be transmitted and the additional signal obtained by level-adjusting by the additional signal level adjusting portion are mi (i=1, 2, . . . , N), a total optical modulation index $\sqrt{\{\Sigma(mi)^2\}}$ does not exceed 0.3.

As described above, in accordance with the tenth aspect, clipping distortion hardly occurs, allowing the realization of transmission of high quality.

According to an eleventh aspect, in the third aspect, the Fabry-Perot-type semiconductor laser has such a chip structure that the active layer having an amplifying function of the optical signal is tapered.

As described above, in accordance with the eleventh aspect, the optical signal emitted from the LD chip can be efficiently coupled to the optical fiber.

According to a twelfth aspect, in the eleventh aspect, the electrical signal to be transmitted is a signal obtained by frequency-division-multiplexing one or more radio signals for mobile communications, one or more contiguous frequency bands are allotted to one or more electrical signals to be transmitted, the oscillator outputs an additional signal with a frequency which is higher than a frequency corresponding to a bandwidth of a widest frequency band among the one or more contiguous frequency bands and lower than a half of a lowest frequency among the one or more contiguous frequency bands.

As described above, in accordance with the twelfth aspect, transmission of a radio signal for mobile communications of high quality can be achieved.

According to a thirteenth aspect, in the twelfth aspect, an electrical signal transmitted using at least one frequency band among the one or more contiguous frequency bands is a code division multiplex signal, and the oscillator outputs an additional signal with a frequency which is higher than a frequency corresponding to a widest frequency band among all of the one or more contiguous frequency bands except the frequency band allotted to the code division multiplex signal and lower than a half of the lowest frequency of the one or more contiguous frequency bands.

As described above, in accordance with the thirteenth aspect, neither of the second order intermodulation distortion nor second order harmonic distortion occurs in the bands except the frequency band allotted to the code-division-multiplexed electrical signal.

According to a fourteenth aspect, in the thirteenth aspect, the optical transmission path includes one or more optical fibers, and a position of an emission end surface of the Fabry-Perot-type semiconductor laser and that of an end surface of the optical fiber coupled thereto are set not to be parallel to each other.

As described above, in accordance with the fourteenth aspect, the amount of reflected return light to the semiconductor laser can be reduced, resulting in further reduction in the value of the lowest level required for the additional signal.

According to a fifteenth aspect, in the fourteenth aspect, the device further comprises an additional signal level adjusting portion for adjusting a level of the additional signal outputted from the oscillator, and the additional signal level adjusting portion adjusts the level of the additional signal outputted from the oscillator so that a frequency modulation index $\beta$ of the optical signal outputted from the semiconductor laser can satisfy a conditional equation $\beta \geq (2/\pi) \cdot 10^{P/10}$ (where $\pi$ is the ratio of the circumference of a circle to its diameter) for reducing noise or distortion, which occurs in this optical transmission, by at least P decibels.

As described above, in accordance with the fifteenth aspect, distortion or noise due to reflected light and reflected return light can be reduced by a desired amount.

According to a sixteenth aspect, in the fifteenth aspect, the additional signal level adjusting portion adjusts the level of the additional signal so that the frequency modulation index $\beta$ can satisfy a conditional equation $\beta \geq 1.7$.

As described above, in accordance with the sixteenth aspect, distortion or noise due to reflected light and reflected return light can be reduced by at least Pmin (the smallest value among a plurality of minimum values of the amount of reduction in distortion P).

According to a seventeenth aspect, in the fourteenth aspect, when optical modulation indexes allotted to the plurality of the electrical signals to be transmitted and the additional signal obtained by level-adjusting by the additional signal level adjusting portion are mi (i=1, 2, ..., N), a total optical modulation index $\sqrt{\{\Sigma(mi)^2\}}$ does not exceed 0.3.

As described above, in accordance with the seventeenth aspect, clipping distortion hardly occurs, allowing the realization of transmission of high quality.

An eighteenth aspect is directed to an optical transmission system of converting an electrical signal into an optical signal directly intensity-modulated by the electrical signal and then bilaterally transmitting the optical signal, comprising:

a first device for transmitting a first electrical signal,
a second device for transmitting a second electrical signal, and
an optical transmission path for interconnecting the first device and the second device,
the first device including:
  an oscillator for outputting an additional signal with a frequency which is lower than a half of the lowest frequency of frequency bands allotted for transmission of the first and second electrical signals,
  a first multiplexing portion for multiplexing the first electrical signal and the additional signal outputted from the oscillator,
  a first DC current source for outputting a DC bias current,
  a first semiconductor laser for outputting an optical signal directly intensity-modulated by a signal obtained by mixing by the first multiplexing portion and the DC bias current outputted by the first DC current source, and
  a first optical-electrical converting portion for converting an optical signal transmitted from the second device into an electrical signal;
the second device including:
  a second optical-electrical converting portion for converting an optical signal transmitted from the first device into an electrical signal,
  a band separating portion for separating the electrical signal obtained by converting by the second optical-electrical converting portion into the first electrical signal and the additional signal outputted from the oscillator,
  a second multiplexing portion for multiplexing the additional signal obtained by separating by the band separating portion and the second electrical signal,
  a second DC current source for outputting a DC bias current, and
  a second semiconductor laser for outputting an optical signal directly intensity-modulated by a signal obtained by mixing a signal obtained by the second multiplexing portion and the DC bias current outputted by the second DC current source; and
the optical transmission path including:
  a first optical fiber for transmitting the optical signal outputted from the first semiconductor laser to the second device, and
  a second optical fiber for transmitting the optical signal outputted from the second semiconductor laser to the first device.

As described above, in accordance with the eighteenth aspect, the oscillator for outputting the additional signal is set only in the first device, thereby allowing reduction in noise or distortion due to reflected light and reflected return light when a signal is transmitted from the first device to the second device or when a signal is transmitted from the second device to the first device.

A nineteenth aspect is directed to an optical transmission system for converting an electrical signal into an optical signal directly intensity-modulated by the electrical signal and then transmitting the optical signal from a plurality of sub-stations to a main station, when the plurality of sub-stations are called first to n-th (where n is an arbitrary even number not less than 2) sub-stations in an wavelength order of optical signals emitted from each station, a 2k-th (where k=1, 2, ..., n/2) sub-station among the plurality of sub-stations comprising:
  an oscillator for outputting an additional signal,
  a multiplexing portion for multiplexing an electrical signal to be transmitted by the sub-station and the additional signal outputted from the oscillator,
  a DC current source for outputting a DC bias current, and
  a semiconductor laser for outputting an optical signal directly intensity-modulated by a signal obtained by mixing a signal obtained by the multiplexing portion and the DC bias current outputted from the DC current source; and
a 2k-1-th sub-station comprising:
  a DC current source for outputting a DC bias current, and
  a semiconductor laser for outputting an optical signal directly intensity-modulated by a signal obtained by mixing the electrical signal to be transmitted by the sub-station and the DC bias current outputted from the DC current source.

As described above, in accordance with the nineteenth aspect, a semiconductor laser is modulated by an additional signal. The semiconductor laser is frequency-modulated simultaneously with being directly intensity-modulated, thereby being subjected to frequency modulation by the additional signal. The spectrum of the frequency-modulated optical signal is expanded in a wide band, and thereby even if reflected light or reflected return light to the semiconductor laser occurs, transmission characteristic deterioration due to them is suppressed. In addition, when the main station receives the optical signals transmitted from a plurality of sub-stations altogether and OBI noise occurs, the transmission characteristic deterioration thereby is suppressed. Further, since the additional signal is added in only even-numbered sub-stations, the system structure becomes simpler than that when the additional signal is added in all sub-stations.

According to a twentieth aspect, in the nineteenth aspect, each semiconductor laser which the plurality of sub-stabons comprise is a Fabry-Perot-type semiconductor laser.

As described above, in accordance with the twentieth aspect, the price of the device can be reduced. Further, since the Fabry-Perot-type semiconductor laser also has an effect of reducing the OBI noise due to multi-mode oscillation, the transmission characteristic is further improved.

According to a twenty-first aspect, in the twentieth aspect, a connection form between the main station and the plurality of sub-stations is a bus form.

As described above, in accordance with the twenty-first aspect, since an optical transmission path is appeared to be one, the optical transmission path can be used more effectively than when the connection form is a tree form.

A twenty-second aspect is directed to an optical transmission system for converting an electrical signal into an optical signal directly intensity-modulated by the electrical signal and then transmitting the optical signal from a plurality of sub-stations to a main station, when the plurality of sub-stations are called first to n-th (where n is an arbitrary odd number not less than 3) sub-stations in an wavelength order of optical signals emitted from each station, a 2k-th (where k=1, 2, ..., (n−1)/2) sub-station among the plurality of the sub-stations comprising:
an oscillator for outputting an additional signal,
a multiplexing portion for multiplexing an electrical signal to be transmitted by the sub-station and the additional signal outputted from the oscillator,
a DC current source for outputting a DC bias current, and
a semiconductor laser for outputting an optical signal directly intensity-modulated by a signal obtained by mixing a signal obtained by the multiplexing portion and the DC bias current outputted from the DC current source; and
a 2k-1-th sub-station comprising:
a DC current source for outputting a DC bias current, and
a semiconductor laser for outputting an optical signal directly intensity-modulated by a signal obtained by mixing the electrical signal to be transmitted by the sub-station and the DC bias current outputted from the DC current source.

As described above, in accordance with the twenty-second aspect, a semiconductor laser is modulated by an additional signal. The semiconductor laser is frequency-modulated simultaneously with being directly intensity-modulated, thereby being subjected to frequency modulation by the additional signal. The spectrum of the frequency-modulated optical signal is expanded in a wide band, and thereby even if reflected light or reflected return light to the semiconductor laser occurs, transmission characteristic deterioration due to them is suppressed. In addition, when the main station receives the optical signals transmitted from a plurality of sub-stations altogether and OBI noise occurs, the transmission characteristic deterioration thereby is suppressed. Further, since the additional signal is added in only even-number-th sub-stations, the system structure is simpler than that when the additional signal is added in all sub-stations. Furthermore, since the total number of sub-stations is an odd number, the system structure is simpler than that when the additional signal is added in only odd-numbered sub-stations.

According to a twenty-third aspect, in the twenty-second aspect, each semiconductor laser which the plurality of sub-stations comprise is a Fabry-Perot-type semiconductor laser.

As described above, in accordance with the twenty-third aspect, the price of the device can be reduced. Further, since the Fabry-Perot-type semiconductor laser also has an effect of reducing the OBI noise due to multi-mode oscillation, the transmission characteristic is further improved.

According to a twenty-fourth aspect, in the twenty-third aspect, a connection form between the main station and the plurality of sub-stations is a bus form.

As described above, in the twenty-fourth aspect, since the optical transmission path is appeared to be one, the optical transmission path can be used more effectively when the connection form is a tree form.

A twenty-fifth aspect is directed to an optical transmission system for converting an electrical signal into an optical signal directly intensity-modulated by the electrical signal and then transmitting the optical signal from a plurality of sub-stations to a main station,
each of the plurality of sub-stations comprising:
an oscillator for outputting an additional signal,
a multiplexing portion for multiplexing an electrical signal to be transmitted by the sub-station and the additional signal outputted from the oscillator,
a DC current source for outputting a DC bias current, and
a semiconductor laser for outputting an optical signal directly intensity-modulated by a signal obtained by mixing a signal obtained by the multiplexing portion and the DC bias current outputted from the DC current source.

As described above, in accordance with the twenty-fifth aspect, a semiconductor laser is modulated by an additional signal. The semiconductor laser is frequency-modulated simultaneously with being directly intensity-modulated, thereby being subjected to frequency modulation by the additional signal. The spectrum of the frequency-modulated optical signal is expanded in a wide band, and thereby even if reflected light or reflected return light to the semiconductor laser occurs, transmission characteristic deterioration due to them is suppressed. In addition, even when the main station receives the optical signals transmitted from a plurality of sub-stations altogether and OBI noise occurs, the transmission characteristic deterioration thereby is suppressed.

According to a twenty-sixth aspect, in the twenty-fifth aspect, each semiconductor laser which the plurality of sub-stations comprise is a Fabry-Perot-type semiconductor laser.

As described above, in accordance with the twenty-sixth aspect, the price of the device can be reduced. Further, since the Fabry-Perot-type semiconductor laser also has an effect of reducing the OBI noise due to multi-mode oscillation, the transmission characteristic is further improved.

According to a twenty-seventh aspect, in the twenty-sixth aspect, a connection form between the main station and the plurality of sub-stations is a bus form.

As described above, in accordance with the twenty-seventh aspect, since the optical transmission path is appeared to be one, the optical transmission path can be used more effectively than when the connection form is a tree form.

According to a twenty-eighth aspect, in the twenty-seventh aspect, each of the oscillators which the plurality of sub-stations comprise outputs the additional signals with different frequencies to each other.

As described above, in accordance with the twenty-eighth aspect, the frequency of the additional signal is judged so that the main station side can know from which sub-station the signal comes.

According to a twenty-ninth aspect, in the twenty-eighth aspect, the additional signal outputted from each of the oscillators is modulated by any data.

As described above, in accordance with the twenty-ninth aspect, by the additional signal, for example, data for monitoring, etc, can be transmitted.

According to a thirtieth aspect, in the twenty-ninth aspect, the main station, in order to detect a failure of the system, further comprises:
an optical-electrical converting portion for converting the optical signal transmitted from the plurality of sub-stations into an electrical signal,
a separating portion for separating the electrical signal obtained by converting by the optical-electrical converting portion into the electrical signal to be transmitted and the additional signals, and
a signal detecting portion for detecting from the additional signals obtained by separating by the separating portion the additional signal outputted from each of the oscillators which the plurality of sub-stations comprise.

As described above, in accordance with the thirtieth aspect, the main station can assume a failure of a sub-station, a broken portion of the optical transmission path, etc., whenever it occurs.

According to a thirty-first aspect, in the thirtieth aspect, the electrical signal to be transmitted is a signal obtained by frequency-division-multiplexing one or more radio signal for mobile communications, one or more contiguous frequency bands are allotted to one or more electrical signals to be transmitted, and each of the oscillators outputs an additional signal with a frequency which is higher than a frequency corresponding to a bandwidth of a widest frequency band among the one or more contiguous frequency bands and lower than a half of a lowest frequency among the one or more contiguous frequency bands.

As described above, in accordance with the thirty-first aspect, transmission of a radio signal for mobile communications in one or more bands of high quality can be achieved.

According to a thirty-second aspect, in the thirty-first aspect, an electrical signal transmitted using at least one frequency band among the one or more contiguous frequency bands is a code division multiplex signal, and each of the oscillators outputs an additional signal with a frequency which is higher than a frequency corresponding to a widest frequency band among all of the one or more contiguous frequency bands except the frequency band allotted to the code division multiplex signal and lower than a half of the lowest frequency of the one or more contiguous frequency bands.

As described above, in accordance with the thirty-second aspect, neither of the second order intermodulation distortion nor second order harmonic distortion occurs in the bands except the frequency band allotted to the code-division-multiplexed electrical signal.

According to a thirty-third aspect, in the thirty-first aspect, each of the Fabry-Perot-type semiconductor lasers has such a chip structure that an active layer having an amplifying function of the optical signal and a spot size converting portion for narrowing an angle of emission of the outputted optical signal are formed on a same substrate.

As described above, in accordance with the thirty-third aspect, the optical signal emitted from the LD chip can be efficiently coupled to the optical fiber.

According to a thirty-fourth aspect, in the thirty-third aspect, each of the plurality of sub-stations further comprises an additional signal level adjusting portion for adjusting a level of the additional signal outputted from each of the oscillators, and the additional signal level adjusting portion adjusts the level of the additional signal outputted from each of the oscillators so that a frequency modulation index $\beta$ of the optical signal outputted from each of the semiconductor lasers can satisfy a conditional equation $\beta<1/(2Q)$ for multiplying OBI noise by Q (where Q<1).

As described above, in accordance with the thirty-fourth aspect, the OBI noise can be reduced by a desired amount.

According to a thirty-fifth aspect, in the thirty-third aspect, each of the plurality of sub-stations further comprises an additional signal level adjusting portion for adjusting a level of the additional signal outputted from each of the oscillators, and the additional signal level adjusting portion adjusts the level of the additional signal outputted from the oscillator so that a frequency modulation index $\beta$ of the optical signal outputted from each of the semiconductor lasers can satisfy both of the conditional equation $\beta<1/(2Q)$ for multiplying OBI noise by Q (where Q<1) and a conditional equation $\beta \geq (2/\pi) \cdot 10^{P/10}$ (where $\pi$ is the ratio of the circumference of a circle to its diameter) for reducing noise or distortion which occurs in this optical transmission by at least P decibels.

As described above, in accordance with the thirty-fifth aspect, distortion or noise due to reflected light, reflected return light and the OBI noise can be reduced by a desired amount.

According to a thirty-sixth aspect, in the thirty-fifth aspect, the optical transmission path includes one or more optical fibers, and a position of an emission end surface of the Fabry-Perot-type semiconductor laser and that of an end surface of an optical fiber coupled thereto are set not to be parallel to each other.

As described above, in accordance with the thirty-sixth aspect, the amount of reflected return light to the semiconductor laser can be reduced, resulting in further reduction in the value of the lowest level required for the additional signal.

According to a thirty-seventh aspect, in the thirty-fifth aspect, when optical modulation indexes allotted to each of the plurality of the electrical signals to be transmitted and the additional signal obtained by level-adjusting by each of the additional signal level adjusting portions are mi (i=1, 2, . . . , N), a total optical modulation index $\sqrt{\{\Sigma(mi)^2\}}$ does not exceed 0.3.

As described above, in accordance with the thirty-seventh aspect, clipping distortion hardly occurs, allowing the realization of transmission of high quality.

According to a thirty-eighth aspect, in the thirty-first aspect, each of the Fabry-Perot-type semiconductor lasers has such a chip structure that the active layer having an amplifying function of the optical signal is tapered.

As described above, in accordance with the thirty-eighth aspect, the optical signal emitted from the LD chip can be efficiently coupled to the optical fiber.

According to a thirty-eight aspect, in the thirty-ninth aspect, each of the plurality of sub-stabons further comprises an additional signal level adjusting portion for adjusting a level of the additional signal outputted from each of the oscillators, and the additional signal level adducing portion adjusts the level of the additional signal outputted from each of the oscillators so that a frequency modulation index $\beta$ of the optical signal outputted from each of the semiconductor lasers can satisfy a conditional equation $\beta<1/(2Q)$ for multiplying OBI noise by Q (where Q<1).

As described above, in accordance with the thirty-ninth aspect, OBI noise can be reduced by a desired amount.

According to a fortieth aspect, in the thirty-eighth aspect, each of the plurality of sub-stations further comprises an additional signal level adjusting portion for adjusting a level of the additional signal outputted from each of the oscillators, and the additional signal level adjusting portion adjusts the level of the additional signal outputted from the oscillator so that a frequency modulation index $\beta$ of the optical signal outputted from each of the semiconductor lasers can satisfy both of the conditional equation $\beta<1/(2Q)$ for multiplying OBI noise by Q (where Q<1) and a conditional equation $\beta \geq (2/\pi) \cdot 10^{P/10}$ (where $\pi$ is the ratio of the circumference of a circle to its diameter) for reducing noise or distortion which occurs in this optical transmission by at least P decibels.

As described above, in accordance with the fortieth aspect, distortion or noise due to reflected light, reflected return light and the OBI noise can be reduced by a desired amount.

According to a forty-first aspect, in the fortieth aspect, the optical transmission path includes one or more optical fibers, and a position of an emission end surface of the Fabry-Perot-type semiconductor laser and that of an end surface of an optical fiber coupled thereto are set not to be parallel to each other.

As described above, in accordance with the forty-first aspect, the amount of reflected return light to the semiconductor laser can be reduced, resulting in further reduction in the value of the lowest level required for the additional signal.

According to a forty-second aspect, in the fortieth aspect, when optical modulation indexes allotted to each of the plurality of electrical signals to be transmitted and the additional signal obtained by level-adjusting by each of said additional signal level adjusting portions are mi (i=1, 2, ..., N), a total optical modulation index $\sqrt{\{\Sigma(mi)^2\}}$ does not exceed 0.3.

As described above, in accordance with the forty-second aspect, clipping distortion hardly occurs, allowing the realization of transmission of high quality.

According to a forty-third aspect, in the thirtieth aspect, each of the Fabry-Perot-type semiconductor lasers are selected from which central wavelengths of the optical signals outputted are separated for a previously set wavelength interval to each other.

As described above, in accordance with the forty-third aspect, OBI noise which causes deterioration of the transmission characteristic becomes the OBI noise only between each of the side modes of the FP-LDs, and thereby deterioration of the transmission characteristic is small compared to the case with the OBI noise from each maximum mode.

According to a forty-fourth aspect, in the forty-third aspect, the number of sub-stations connected to one optical fiber is 3 at the maximum.

As described above, in accordance with the forty-fourth aspect, it is enough to allocate three wavelength regions at the time of wavelength selection of the FP-LD. In this case, since limit of regions is only on one side except in the center wavelength regions, wavelength selection can be easily performed.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
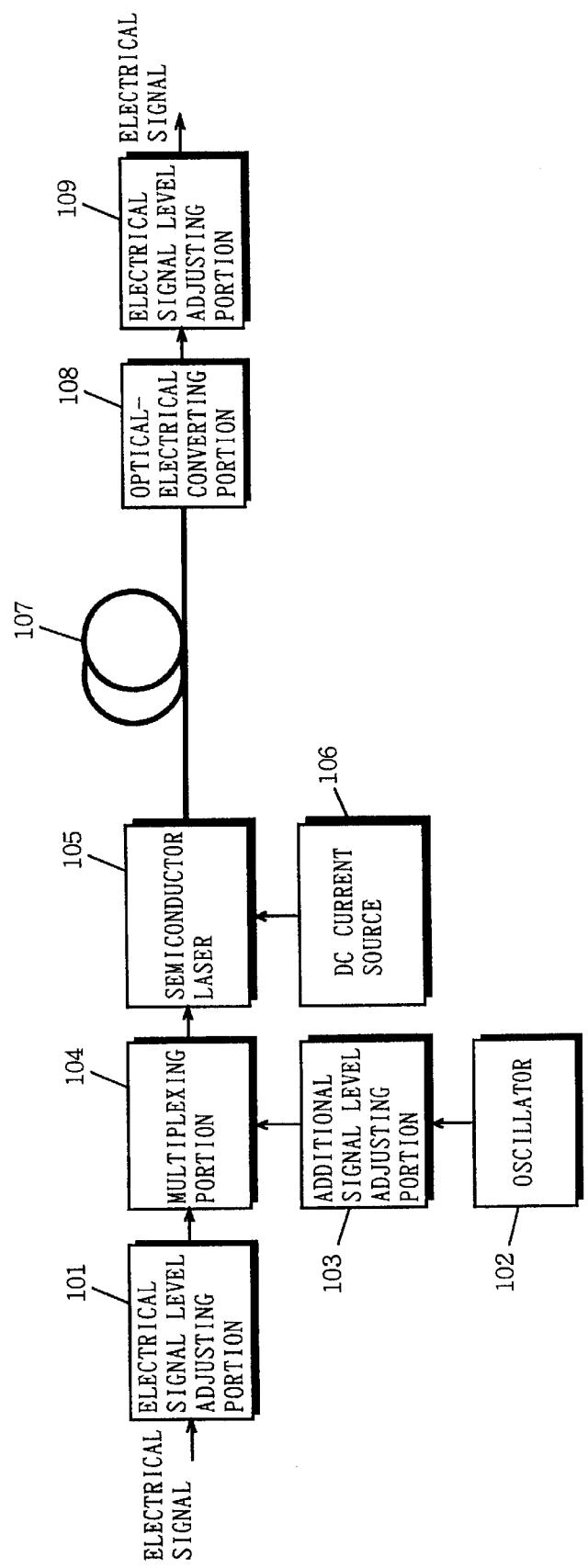
FIG. 1 is a block diagram showing the structure of an optical transmission device according to a first embodiment of the present invention.

Described below are embodiments of the present invention referring to the drawings.

(First Embodiment)

FIG. 1 is a block diagram showing the structure of optical transmission device according to a first embodiment of the present invention. The device in FIG. 1 includes an electrical signal level adjusting portions 101 and 109, an oscillator 102, an additional signal level adjusting portion 103, a multiplexing portion 104, a semiconductor laser 105, a DC current source 106, an optical fiber 107, and an optical-electrical converting portion 108.

The electrical signal level adjusting portions 101 and 109 each adjust a level of an electrical signal. The oscillator 102 outputs an additional signal (here, a sine wave). The additional signal level adjusting portion 103 adjusts the level of the additional signal. The multiplexing portion 104 multiplexes the electrical signal and the additional signal. The DC current source 106 outputs a bias current for adding a DC bias current to the electrical signal. The semiconductor laser 105 outputs an optical signal directly intensity-modulated by the electrical signal and the DC bias current. The optical fiber 107 transmits the optical signal. The optical-electrical converting portion 108 converts the optical signal into an electrical signal.

Described below is operation of transmitting an electrical signal by the device in FIG. 1. Here, the electrical signal to be transmitted is supposed to be a signal obtained by multiplexing a prescribed signal, and specifically a signal obtained by frequency-division-multiplexing a radio signal for mobile communications.

The inputted electrical signal is adjusted at a prescribed level in the electrical signal level adjusting portion 101. On the other hand, the additional signal outputted by the oscillator 102 is adjusted at a prescribed level in the additional signal level adjusting portion 103. The multiplexing portion 104 multiplexes the level-adjusted electrical signal and additional signal. When the DC current source 106 outputs a DC bias current for adding a prescribed DC bias current to the electrical signal to be transmitted, the semiconductor laser 105 outputs an optical signal directly intensity-modulated by the DC bias current outputted by the DC current source 106 and the electrical signal obtained by multiplexing by the multiplexing portion 104. The outputted optical signal is transmitted through the optical fiber 107 to a receiving side. The transmitted optical signal is converted into an electrical signal in the optical-electrical converting portion 108, further adjusted at a prescribed level in the electrical signal level adjusting portion 109, and then outputted.

In the above operation, when the optical signal is transmitted to the receiving side, reflection occurs on a connection surface of the optical fiber 107 or end surfaces of the semiconductor laser 105 and the optical-electrical converting portion 108 and reflected light occurs. Also, Rayleigh backscattering in the optical fiber 107, etc. causes reflected light. Further, when reflected light is re-reflected or re-re-reflected, multiple reflected light also occurs. Noise or distortion by these reflected light deteriorates the transmission characteristic of the device in FIG. 1, if only the electrical signal inputted to the electrical signal level adjusting portion 101 is transmitted. However, in the device of FIG. 1, the additional signal level adjusting portion 103 adjusts the level of the additional signal outputted from the oscillator 102 to reduce noise or distortion due to the reflected light. Details will be described below.

The optical signal outputted by the semiconductor laser 105 is directly intensity-modulated and frequency-modulated simultaneously. A frequency modulation index is generally represented by a ratio between an amount of maximum frequency deviation and a modulated frequency. A frequency modulation index $\beta$ by the additional signal outputted from the oscillator 102 is given by the following equation (1), where the frequency of the additional signal is f, the DC bias current outputted from the DC current source 106 is $I_b$, a light emitting threshold current of the semiconductor laser 105 is $I_{th}$, an optical modulation index is m, and frequency modulation efficiency of the semiconductor laser 105 is dF/dI.

$$\beta = \{m \cdot (I_b - I_{th}) \cdot (dF/dI)\}/f \qquad (1)$$

On the other hand, an amount of reduction of noise or distortion by reflected light which occurs at the time of optical transmission P (its unit is a decibel: hereinafter referred to as dB) can be expressed in the following equation (2) using the Bessel function $J_0$ of zero-order.

$$P = 10 \cdot \log\{J_0(\beta)^2\} \qquad (2)$$

Figure 2:
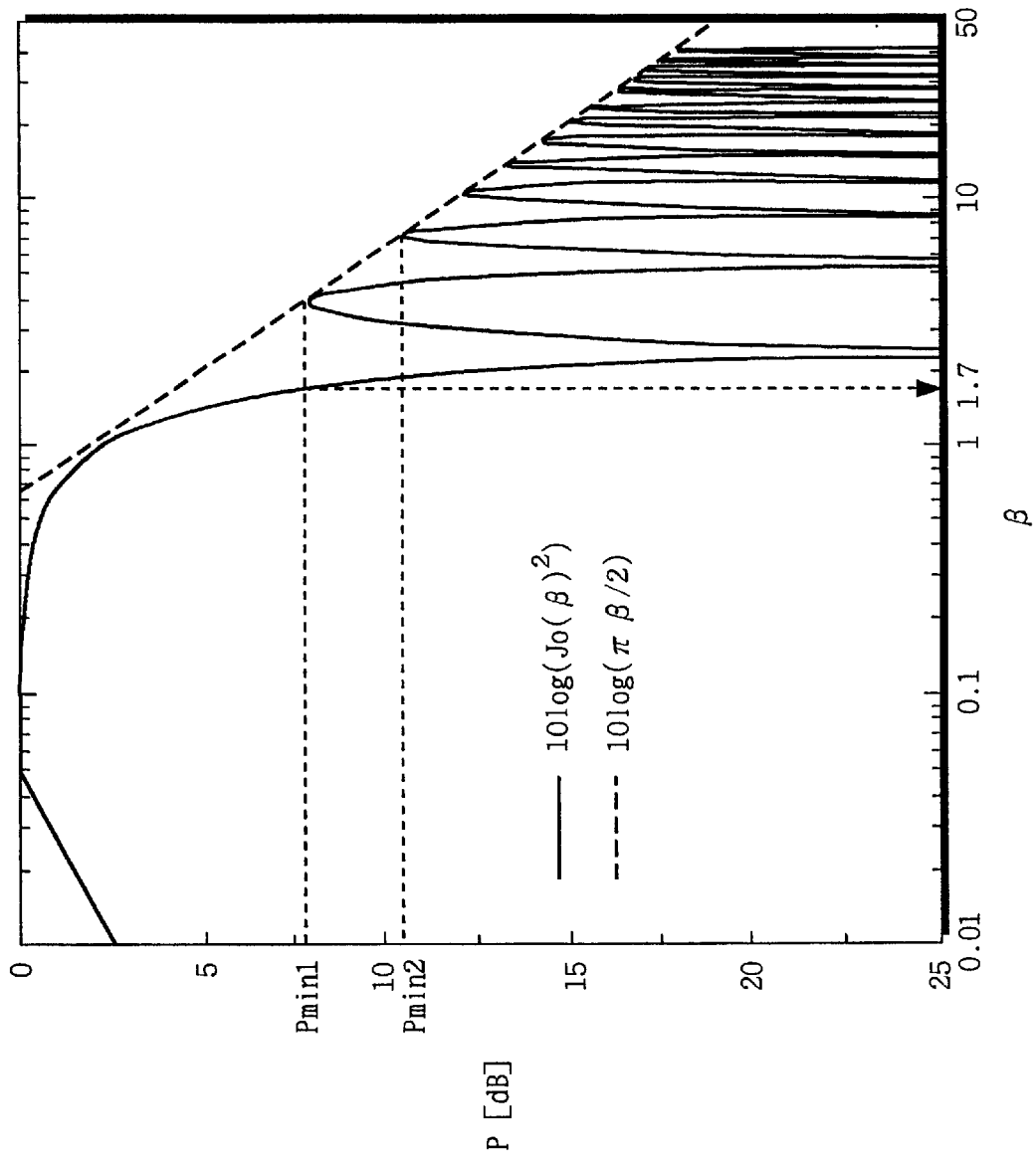
FIG. 2 is a graph showing the relation between a frequency modulation index β and an amount of reduction P dB of noise or distortion by reflected light which occurs at the time of optical transmission.

FIG. 2 is a graph showing the relation between the frequency modulation index $\beta$ and the amount of reduction of noise or distortion by reflected light which occurs at the time of optical transmission P dB. In FIG. 2, the horizontal axis is represented logarithmically. As can be seen from FIG. 2, the amount of reduction P is at most several decibels where $\beta<1$, while greatly increasing and decreasing repeatedly in accordance with changes of $\beta$ where $\beta>1$. And its minimum values Pmin1, Pmin2, . . . have a characteristic that they monotonously increase as the frequency modulation index $\beta$ becomes larger (that is, Pmin1<Pmin2< . . . ).

Further, minimum points corresponding to the above minimum values Pmin1, Pmin2, . . . are each aligned on a line represented by a dotted line in FIG. 2. We newly found that considering the amount of dispersion of the power spectrum caused by the oscillation frequency of the laser light being subjected to frequency modulation and the limit of the Bessel function $J_0$ of zero-order, this line is approximated by the following equation (3).

$$P = 10 \cdot \log(\pi\beta/2) \qquad (3)$$

From the above equation (3), the conditional equation for reducing noise or distortion by reflected light by at least P dB, that is, the following equation (4), can be obtained.

$$\beta = (2/\pi) \cdot 10^{P/10} \qquad (4)$$

In the above equation (1), the light emitting threshold Ith and the frequency modulation efficiency dF/dI are unique values to the semiconductor laser 105, and the optical modulation index m is determined by the level of the additional signal. Therefore, when the frequency of the additional signal and the DC bias current are each set to be values within a suitable range, it is possible to make the frequency modulation index $\beta$ to be a value which satisfies the above equation (4) by adjusting the level of the additional signal. That is, the additional signal level adjusting portion 103 adjusts the level of the additional signal outputted from the oscillator 102 so that the frequency modulation index $\beta$ can take a value which satisfies the above equation (4), allowing reduction in noise or distortion by reflected light by at least P dB.

Further, as can be seen from FIG. 2, $\beta=1.7$ is a minimum of $\beta$ by which the amount of reduction equal to the first minimum value Pmin1 can be obtained. Therefore, the additional signal level adjusting portion 103 adjusts the level of the additional signal outputted from the oscillator 102 so that $\ominus \geq 1.7$ can be satisfied, allowing reduction in noise or distortion by reflected light by at least Pmin1 dB.

As can be seen from the above equation (1), instead of adjusting the level of the additional signal, the bias current may be adjusted. Or, the level of the additional signal and the bias current may be adjusted simultaneously.

Here, generally, when an electrical signal obtained by multiplexing a plurality of signals is converted into an optical signal directly intensity-modulated by the electrical signal and then transmitted, when the number of signals to be multiplexed is taken as N, an optical modulation index to be allotted to each signal is taken as $m_1$, and an optical modulation index to be allotted to the additional signal is taken as $m_2$, the total optical modulation index is represented as $\sqrt{\{(m_1)^2 \cdot N + (m_2)^2\}}$. It is required that this total optical modulation index should be not more than a certain value due to limitation of the distortion (composite of triple beat (CTB)) characteristic which occurs at the time of electrical-optical conversion in the semiconductor laser 105. For example, in signal transmission in CATV, the certain value is generally to be 0.45.

Figure 3:
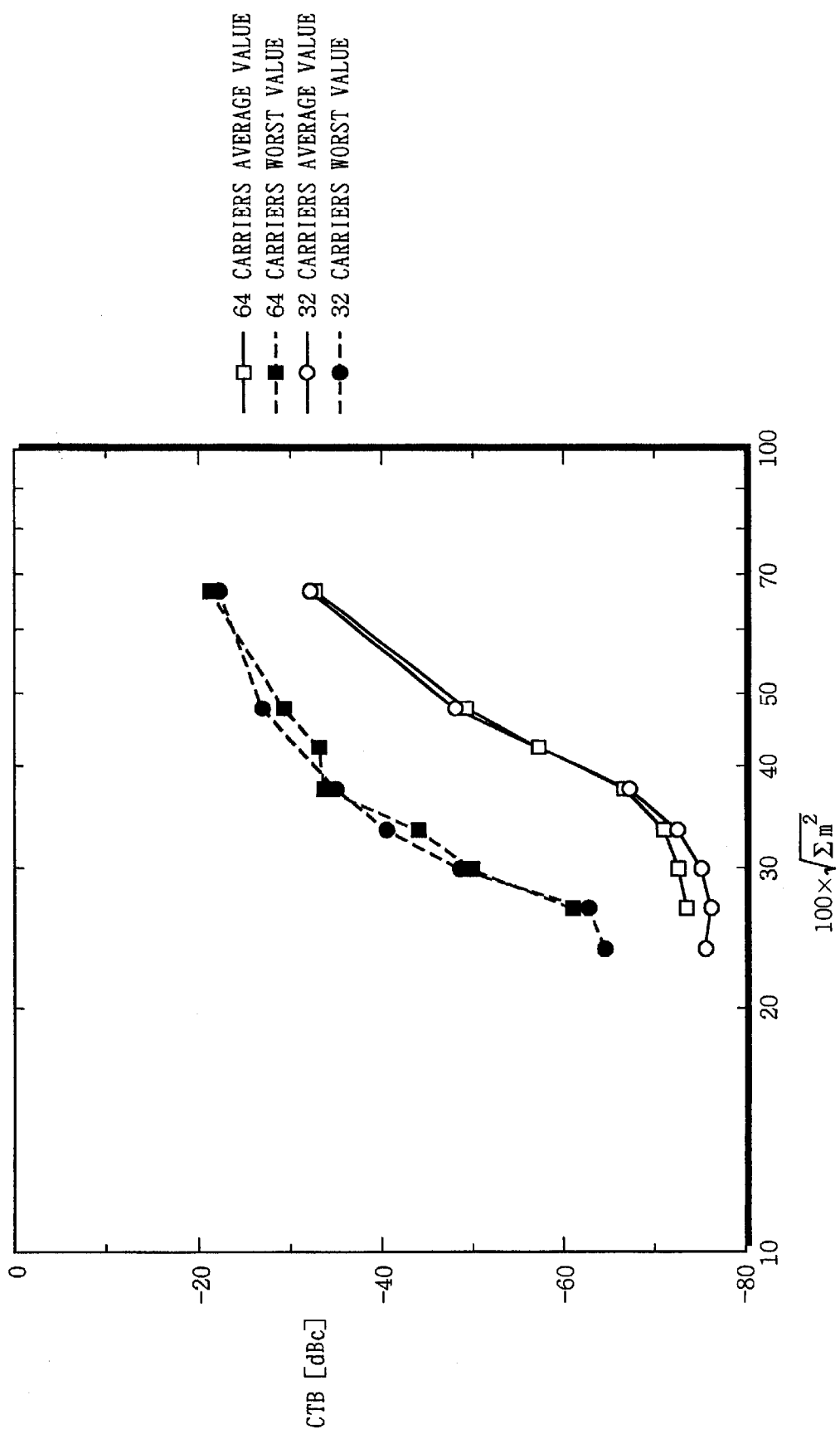
FIG. 3 is a diagram showing a total optical modulation index dependency of third order intermodulation distortion which occurs at the time of electrical-optical conversion.

However, in transmission of cellular telephone signals, since ultra-low-distortion characteristic (approximately 70 dB, depending on applied parts), it is required to set the total optical modulation index to be not more than 0.3. Described below is the reason using FIG. 3. FIG. 3 shows dependency of the total optical modulation index of the CTB which occurs at the time of electricaloptical conversion (FIG. 3 shows average values and worst values in case of 32 and 64 carriers, which will be described later.) In FIG. 3, it can be seen that when the total optical modulation index becomes not less than 0.3, the CTB surges. This is a phenomenon which occurs because the electrical signal inputted into the semiconductor laser 105 is not more than the threshold current of the semiconductor laser 105. This surging distortion is called clipping distortion, which becomes a factor causing great deterioration of the transmission characteristic. It is generally known that since clipping distortion causes a burst error when a digital modulation signal is transmitted, the bit error rate cannot be reduced by even using an error correction code. The total optical modulation index is set to be not more than 0.3 to allow the above clipping distortion to hardly occur, allowing realization of optical transmission of high quality.

Further, as $\beta$ is larger, the optical modulation index $m_2$ allotted to the additional signal becomes larger and thus an optical modulation index allottable to the above plurality of signals becomes smaller by that amount, resulting deterioration of signal transmission quality. Therefore, in view of signal transmission quality, $\beta$ is preferably as small as possible. That is, the additional signal level adjusting portion 103 adjusts the level of the additional signal outputted from the oscillator 102 so that the frequency modulation index $\beta$ can satisfy the conditional equation $\beta \geq 1.7$, thereby obtaining an effect of a balance between reduction in noise or distortion by reflected light and signal transmission quality.

In this way, the additional signal having the above described level is added to the electrical signal to be transmitted, thereby allowing reduction in noise or distortion by reflected light by at least a prescribed amount. However, on the other hand, a second order intermodulation distortion (hereinafter referred to as IM2) between the additional signal and the electrical signal to be transmitted newly occurs, which deteriorates the transmission characteristic. Therefore, described below is operation of suppressing IM2 by the device in FIG. 1.

When the frequency of the additional signal outputted from the oscillator 102 is not more than the frequency corresponding to the transmission frequency bandwidth of the electrical signal to be transmitted, IM2 occurs in the transmission frequency band of the electrical signal. Further, when the frequency of the additional signal outputted from the oscillator 102 becomes not less than ½ of the lowest frequency of the transmission frequency band of the electrical signal to be transmitted, the largest secondary harmonic distortion (hereinafter referred to as HD) among harmonic distortion of the electrical signal may occur within the transmission frequency band.

In addition, considering that the frequency modulation index $\beta$ can be made larger as the frequency of the additional signal outputted from the oscillator 102 is smaller, the frequency of the additional signal is made not less than the frequency corresponding to the bandwidth of the transmission frequency band of the electrical signal to be transmitted and not more than ½ of the lowest frequency of the transmission frequency band of the electrical signal to be transmitted, allowing prevention of either of IM2 or HD from occurring in the transmission frequency band.

When the electrical signal to be transmitted is a radio signal for mobile communications, there are worries IM2 or HD outside the transmission frequency band of the electrical signal might be emitted into the air to become an unnecessary emission. However, this can be solved by selecting only signals in the transmission frequency band through a band pass filter.

For example, suppose that the electrical signal to be transmitted is a signal obtained by frequency-multiplexing a radio signal for digital cellular telephone in Japan. The transmission frequency band for digital cellular telephone in Japan is divided into two bands: called as an 800 MHz band and a 1.5 GHz band. Considered is a case where optical transmission is performed using only the 800 MHz band. In this case, since the transmission frequency band of the downward signal is 810–830 MHz, the bandwidth of the transmission frequency band is 20 MHz and ½ of the lowest frequency of the transmission frequency band is 405 MHz. Therefore, the oscillation frequency of the oscillator 102 is set so as to obtain the additional signal with frequency not less than 20 MHz and not more than 405 MHz, preventing both IM2 and HD from occurring in the transmission frequency band.

Further, considering that the frequency modulation efficiency is inversely proportional to the modulation frequency, the frequency of the additional signal is preferably as low as possible. That is, in the above example, the frequency of the additional signal preferably has a value dose to 20 MHz. However, when only signals in the transmission frequency band are passed by a band pass filter so as to interrupt unnecessary emission outside the band and the like, there are worries that the band pass filter cannot sufficiently lower the level of IM2 when IM2 occurs in the vicinity of the transmission frequency band. However, this can be solved by setting the frequency of the additional signal to be slightly higher than 20 MHz to locate the frequency of IM2 away from the maximum frequency of the transmission frequency band.

Here, according to the above example of cellular telephone, the above description will be summarized below. For example, given that the frequency of the additional signal outputted from the oscillator 102 is approximately 22 MHz, since the frequency is higher than the bandwidth of 20 MHz of the transmission frequency band and lower than ½ of the lowest frequency of 810 MHz of the transmission frequency band, neither IM2 nor HD occurs. Further, as to noise or distortion by reflected light, when the DC bias current outputted by the DC current source 106 is 40 mA, the light emitting threshold current of the semiconductor 105 is 10 mA, and the frequency modulation efficiency of the semiconductor laser 105 is 220 MHz/mA, if the optical modulation index $m_2$ is not less than 0.57%, the frequency modulation index $\beta$ takes a value which satisfies the conditional equation $\beta \geq 1.7$. Therefore, the level of the additional signal is adjusted so that the optical modulation index can be not less than 0.57%, allowing reduction in noise or distortion by reflected light by at least Pmin1 dB (in FIG. 2, approximately 6 decibels).

Further, considering that a signal is transmitted using two bands of 800 MHz and 1.5 GHz bands, the 1.5 GHz band is wider in bandwidth, having a bandwidth of 36 MHz. Therefore, the frequency of the additional signal outputted from the oscillator 102 is set to be not less than 36 MHz (for example, approximately 40 MHz). Further, in this case, in order to satisfy $\beta \geq 1.7$ under the same condition as described above, the optical modulation index is not less than 1.03%. In this way, transmission using a plurality of bands can be performed, keeping the same effect as that of the transmission using a single band. The bandwidth of the transmission frequency band actually allotted to each provider for cellular telephone service is much narrower. When a radio signal is transmitted by such a narrow transmission frequency band, the oscillation frequency and the optical modulation index are set based on the bandwidth.

By the way, generally, in an analog optical transmission device using a semiconductor laser, other than noise or distortion by reflected light as described above (noise or distortion which reflected light directly brings), the influence of reflected light incident to a laser chip (hereinafter referred to as reflected return light) may present a problem. Although the influence of reflected return light is not completely elucidated, it is known that laser oscillation becomes unstable to cause mode hopping. We experimentally confirmed that when a Fabry-Perot-type semiconductor laser (hereinafter referred to as FP-LD) is used, the reflected return light which occurs by Rayleigh scattering makes the laser oscillation unstable, resulting in increase in noise or distortion.

As described in Background Art section, the semiconductor laser for use in optical transmission is mainly a distributed-feedback-type semiconductor laser (hereinafter referred to as DFB-LD) and an FP-LD. Among them, for analog optical transmission, a DFB-LD is generally used. The DFB-LD module contains an optical isolator, which reduces the amount of reflected light incident into the laser chip to not more than 1/10,000. Therefore, in the conventional analog optical transmission device with the DFB-LD, although it is hardly affected by the reflected return light, the price of the DFB-LD is approximately ten times the price of the FP-LD, causing a problem of high costs of the device.

On the other hand, the FP-LD is generally used for optical digital transmission, having no optical isolator. Therefore, despite its low costs, the FP-LD is not used for analog optical transmission conventionally. However, the device in FIG. 1 can also reduce noise or distortion by reflected return light as in the same manner as to reduce noise or distortion by reflected light. That is, since the device in FIG. 1 surely reduces noise or distortion caused by reflected light at the time of transmission by at least a prescribed amount as well as reducing noise or distortion by reflected return light, the FP-LD can be adapted as the semiconductor laser 105, resulting in huge reduction in cost of the device.

The signal outputted from the oscllator 102 is not limited to be a signal with a sine wave, and may be an analog-modulated/digital-modulated signal. In this case, by the additional signal, data for monitoring, etc., can be transmitted.

Further, in recent years, in order to efficiently couple an optical signal emitted from an LD chip to an optical fiber, an FP-LD capable of narrowing the angle of emission of the optical signal has been developed. The FP-LD of this type is roughly divided into two types depending on its chip structure. One is a type that a tapered waveguide for narrowing the angle of emission is formed outside an active layer of the conventional structure on the same sub-strate as the active layer, and the other is a type that the active layer itself is shaped like a taper. In either type of the FP-LDs, light power coupled to the optical fiber is expected to double or triple compared to the conventional one. However, on the contrary, this also means that reflected return light from the optical fiber transmission path is prone to be coupled to the LD chip. Therefore, in the above FP-LD capable of narrowing the angle of emission of the optical signal, it is essential to add an additional signal in the above described manner. In this case, a position of the emission end surface of the FP-LD chip and that of the optical fiber end surface are set not to be parallel to each other to allow reduction in the amount of reflected return light, resulting in further reduction in the lowest level required for the additional signal.

Further, consider a case where one of a plurality of contiguous transmission frequency bands (for example, the above described 800 MHz band and 1.5 GHz band) is allotted for transmission of a code division multiplex signal. In transmission of the code division multiplex signal, since the signal allotted to each code is generally transmitted with approximately the same power to each other, a wide dynamic range characteristic is not required. Therefore, the frequency of the additional signal is set higher than the frequency corresponding to the bandwidth of the widest frequency band among the one or more contiguous frequency bands other than the frequency band allotted to the code division multiplex signal and lower than ½ of the lowest frequency among the one or more contiguous frequency bands, preventing both IM2 and HD from occurring in the one or more contiguous frequency bands other than the frequency band allotted to the code division multiplex signal.

Furthermore, when a plurality of frequency multiplex signals or code division multiplex signals are optical-transmitted altogether, it is known that distortion due to dipping in the semiconductor laser occurs. This clipping distortion has already been mentioned using FIG. 3. FIG. 3 shows a result of measurement of a relation between an optical modulation index allotted to each carrier component mi=m and composite triple beat (hereinafter referred to as CTB), which is one type of the third order intermodulation distortion. We measured average values and max hold values (maximum values) of CTB for 16 and 32 carriers transmission in respectively 800 MHz band and 1.5 GHz band, i.e., 32 and 64 carriers in total. The measured frequency is 800 MHz band. In FIG. 3, when $\sqrt{\{\Sigma(mi)^2\}}$ exceeds 0.3, it can be seen that both of the average values and maximum values are greatly deteriorated regardless of the number of transmission carriers. From this measurement result, it can be seen that in order to hold a low distortion characteristic without receiving the influence of distortion by dipping, each carrier component may be allotted the optical modulation index mi which satisfies the conditional equation $\sqrt{\{\Sigma(mi)^2\}}$.

Figure 4:
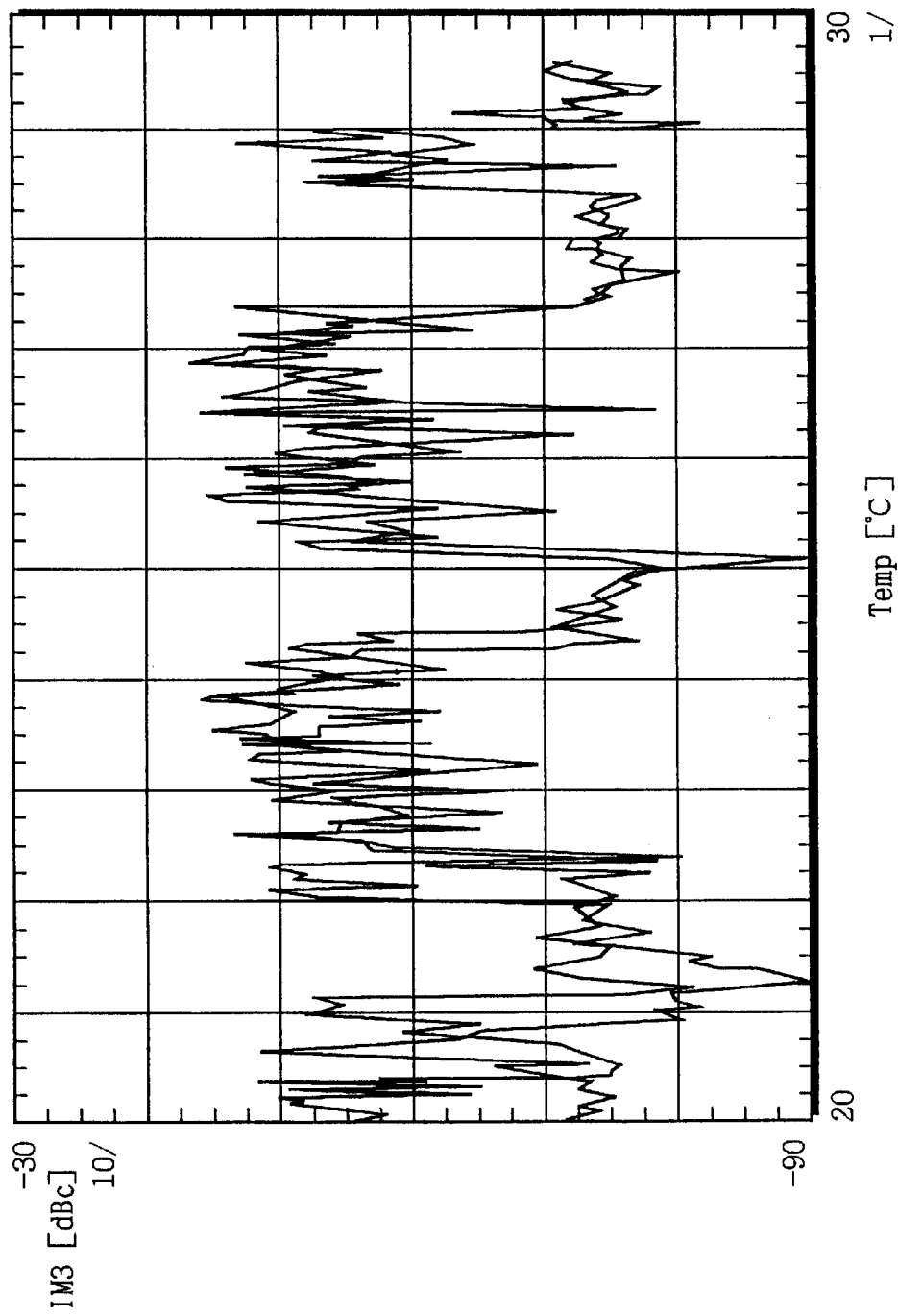
FIG. 4 is a diagram showing the result of measurement of temperature dependency of the third order intermodulation distortion (IM3) (when no additional signal exists).
Figure 5:
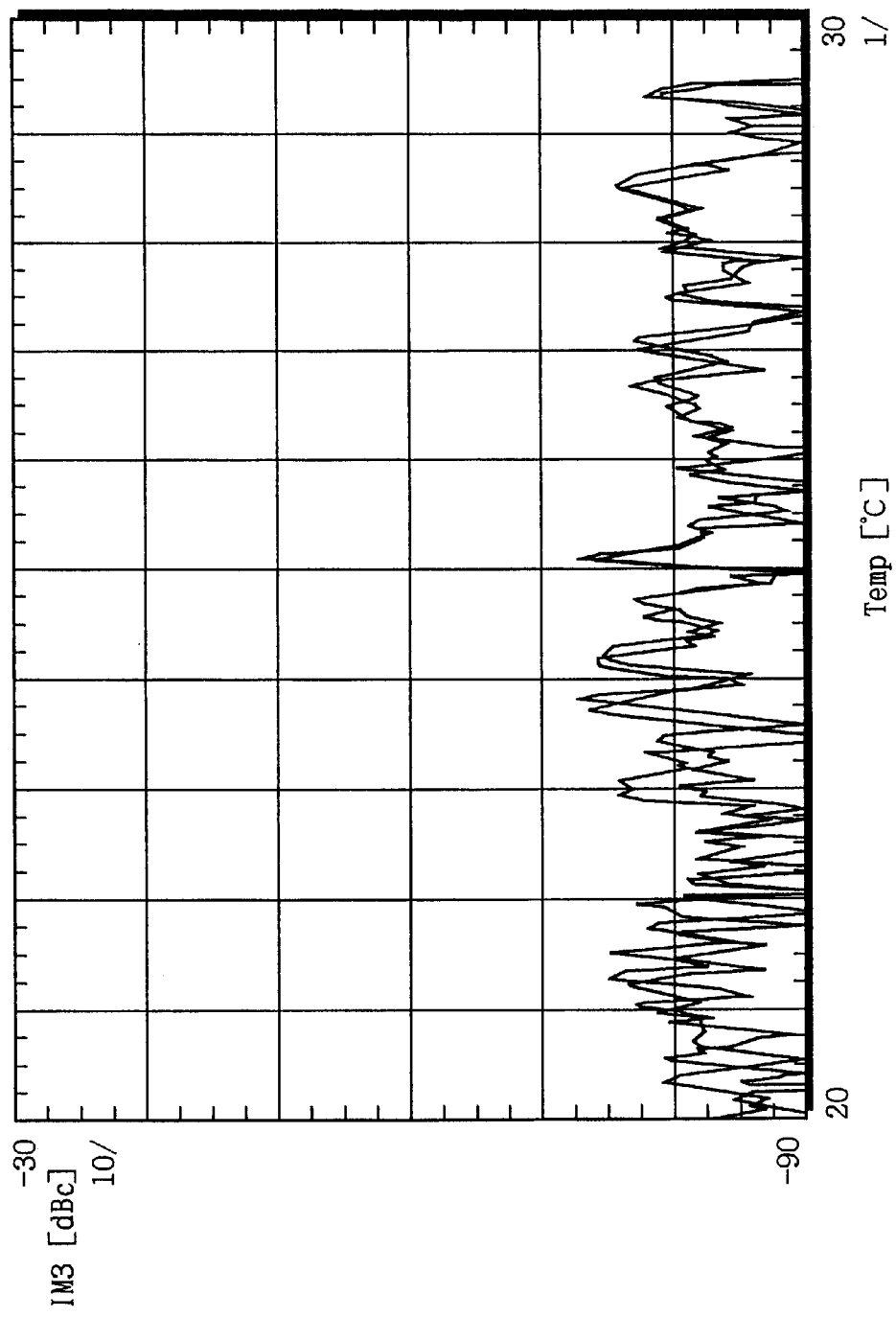
FIG. 5 is a diagram showing the result of measurement of temperature dependency of the third order intermodulation distortion (IM3) (when an additional signal exists).
Figure 6:
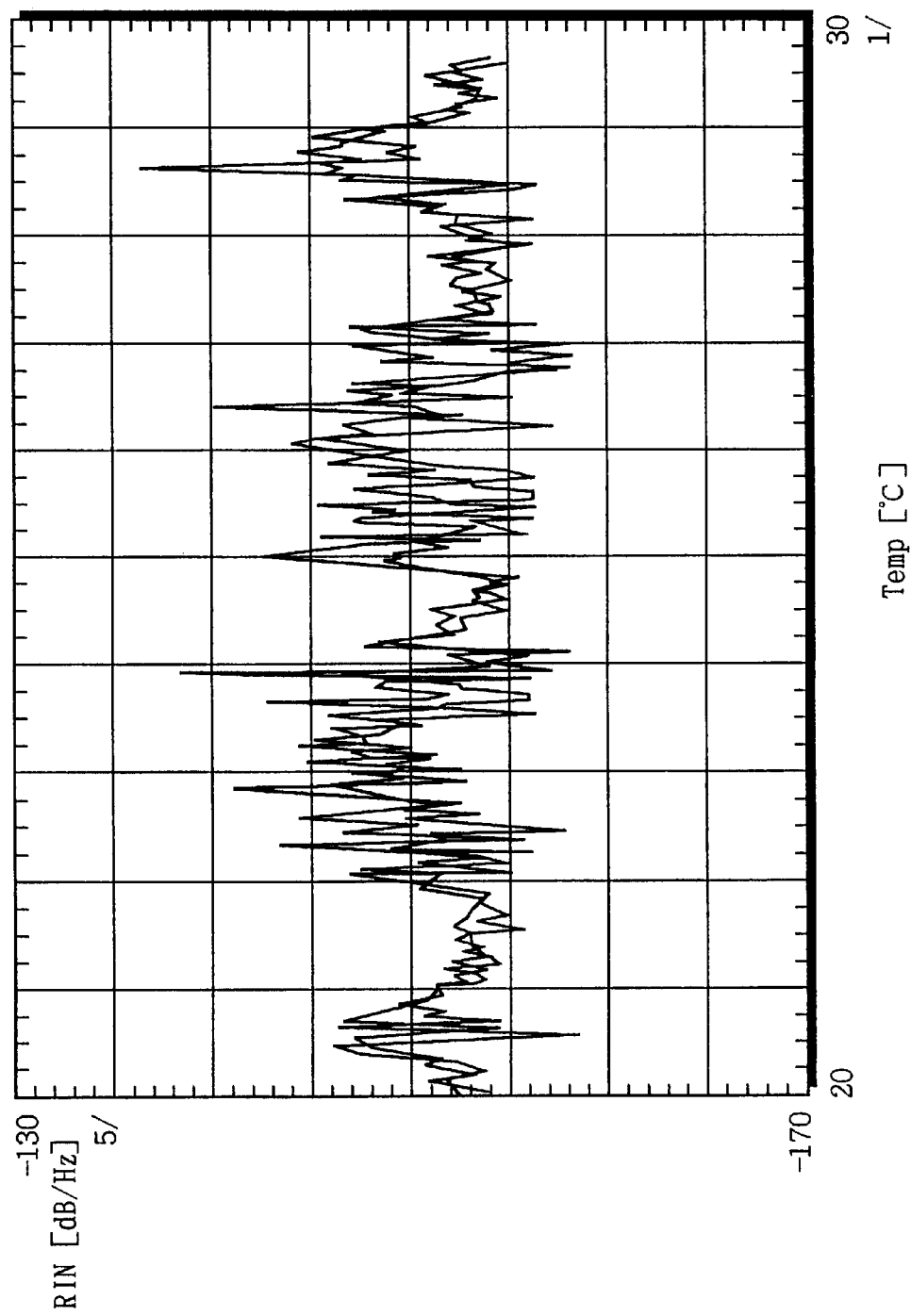
FIG. 6 is a diagram showing the result of measurement of temperature dependency of noise (when an additional signal exists).
Figure 7:
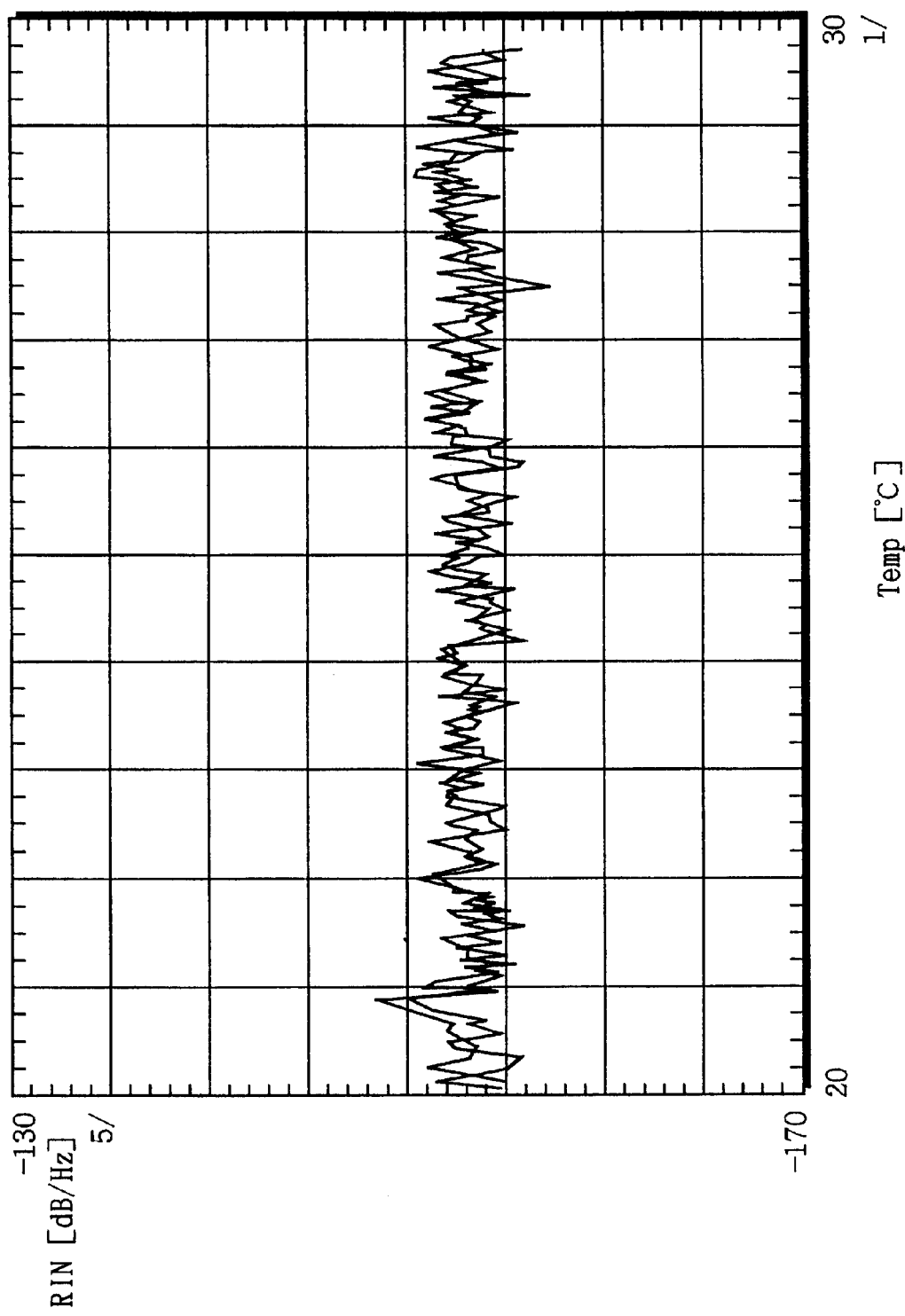
FIG. 7 is a diagram showing the result of measurement of temperature dependency of noise (when no additional signal exists).

Measurement results actually confirmed regarding the effects of the present invention are shown in FIG. 4 to FIG. 11. FIG. 4 and FIG. 5 show results of measurement of temperature dependencies of the third order intermodulation distortion (IM3), without and with the additional signal in FIG. 4 and FIG. 5, respectively. FIG. 6 and FIG. 7 show results of measurement of temperature dependencies of noise, with and without the additional signal in FIG. 6 and FIG. 7, respectively. In FIG. 4 to FIG. 7, the FP-LD is used for a light source, sine waves with frequency of 1485.9 MHz and 1492.1 MHz (its optical modulation index is 10%) are used for input electrical signals, and a sine wave with frequency of 25.8 MHz (its optical modulation index is 10%) is used for the additional signal. The optical fiber is 2 km in length. The frequency of IM3 measures 1479.7 MHz, and the frequency of noise measures 1489 MHz.

In FIG. 4 and FIG. 5, when no additional signal exists, it can be seen that IM3 greatly increases in the vicinity of 20 to 21° C., 22 to 24.5° C., 25 to 27.5° C., 28.5 to 29° C., and IM3 characteristic deteriorates to approximately −45 dB. On the other hand, when an additional signal exists, IM3 is not more than approximately −85 dB in any temperature, and the IM3 characteristic is improved for approximately 40 dB as compared to the case without the additional signal.

In FIG. 6 and FIG. 7, when no additional signal exists, it can be seen that noise greatly increases in the vicinity of 20 to 21° C., 22 to 24.5° C., 25 to 27.5° C., 28.5 to 29° C. The vertical axis shows relative intensity noise (RIN), and RIN increases in the vicinity of each of the above temperatures to approximately −137 dB/Hz. On the other hand, when the additional signal exists, RIN is not more than approximately −152 dB/Hz in any temperature, and it can be seen that the noise characteristic is improved for as much as approximately 15 dB as compared to the case without the additional signal.

Figure 8:
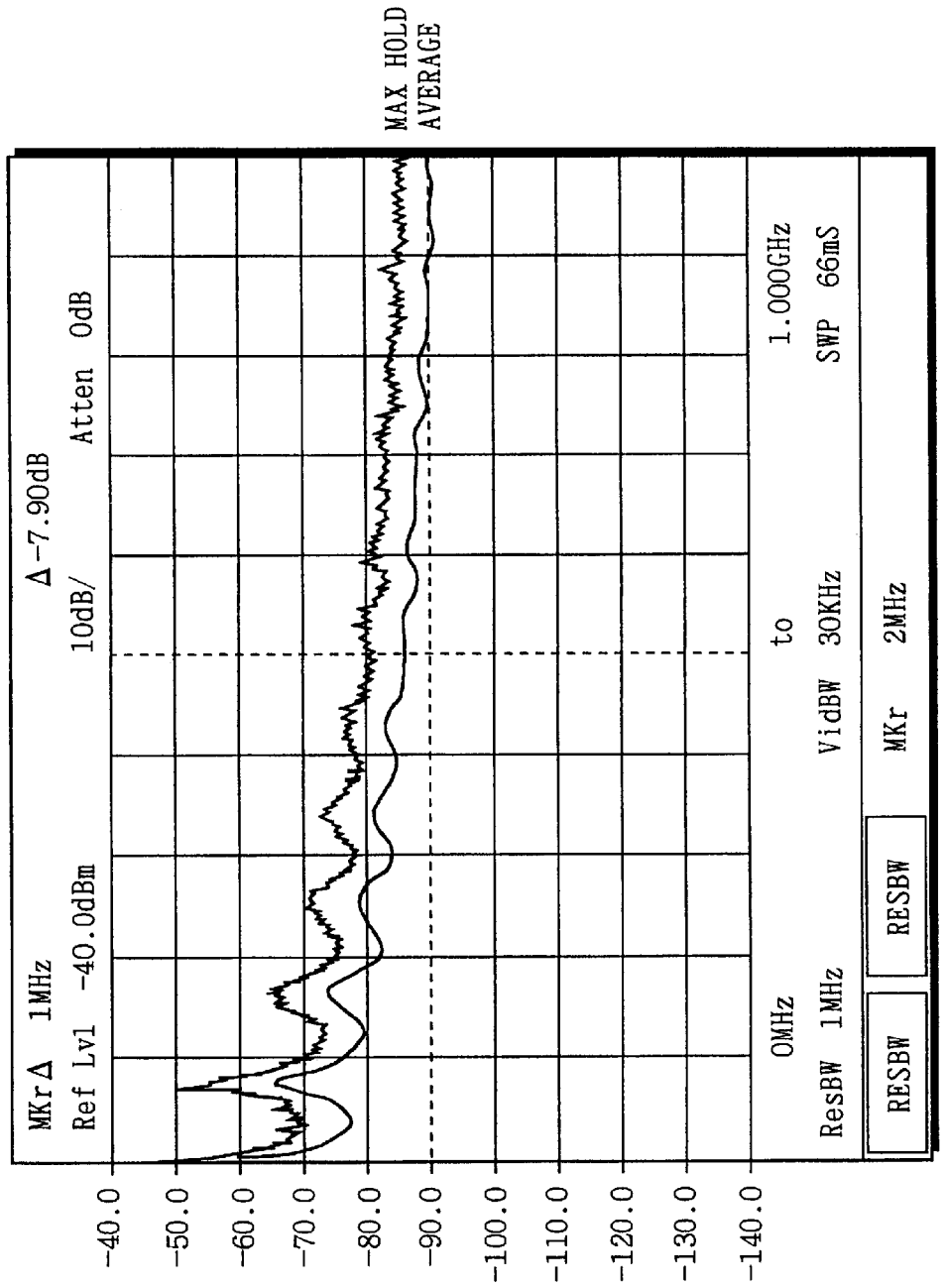
FIG. 8 is a diagram showing a spectrum of an FP-LD in the vicinity of 25 to 27.5° C.
Figure 9:
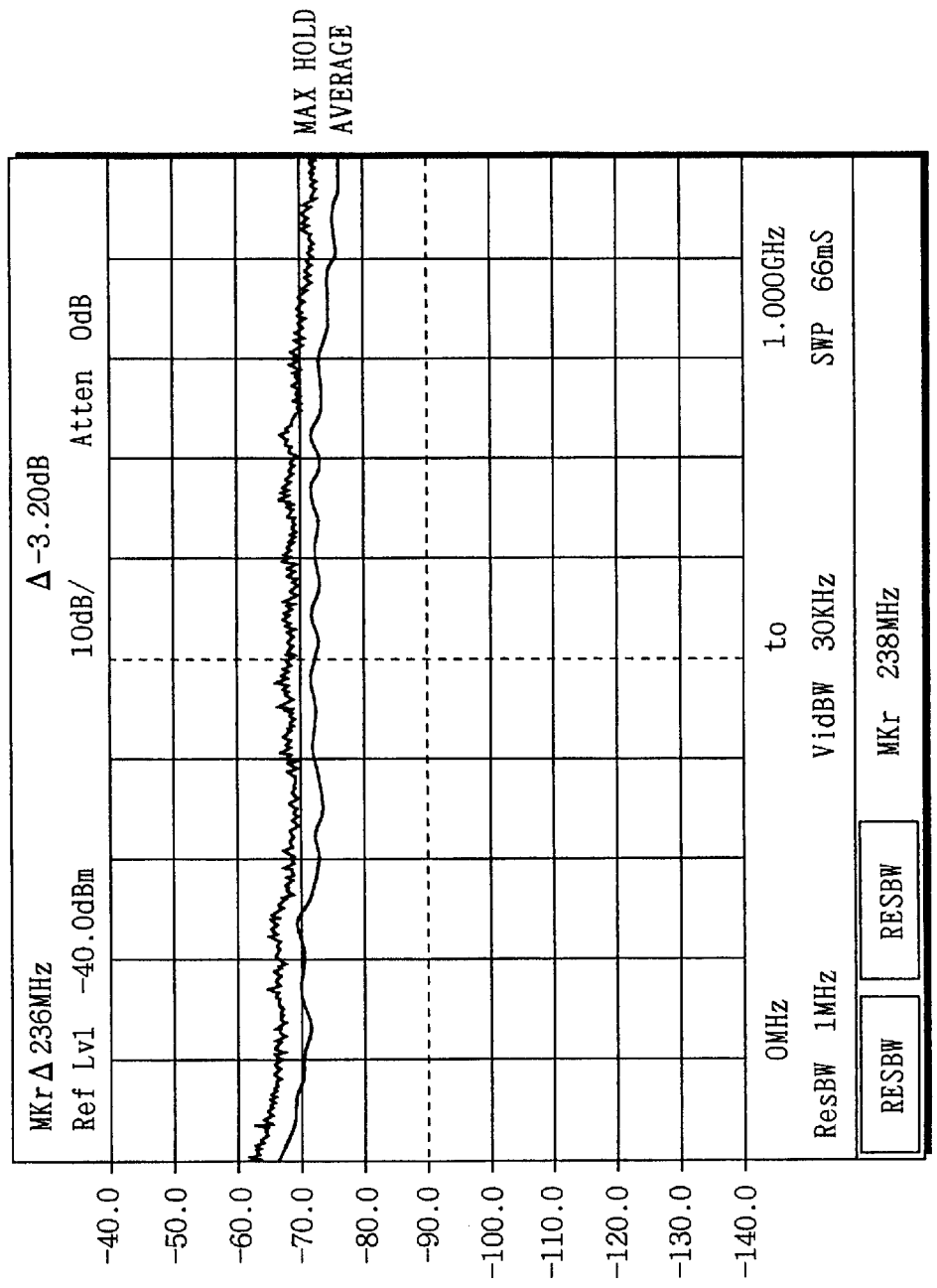
FIG. 9 is a diagram showing a spectrum of the FP-LD in the vicinity of 21 to 22° C.

The reason for deterioration in the IM3 characteristic and the noise characteristic is thought to be mainly Rayleigh scattering light which occurs in the optical fiber, but only this cannot provide an explanation why IM3 and RIN have a temperature dependency. Therefore, we measured the spectrum line widths of the FP-LD by a self-delay homodyne method in the vicinity of 25 to 27.5° C. where both IM3 and RIN greatly deteriorate and in the vicinity of 21 to 22° C. where they hardly deteriorate. The results of these measurement are shown in FIG. 8 and FIG. 9. FIG. 8 shows a spectrum of the FP-LD in the vicinity of 25 to 27.5° C., and FIG. 9 shows a spectrum of the FP-LD in the vicinity of 21 to 22° C. Shown in FIG. 8 and FIG. 9 are the average values and the max hold values.

In FIG. 8 and FIG. 9, as to the spectrum in the temperature of great deterioration (shown in FIG. 8), its spectrum line width is not more than 1 MHz in the 3 dB bandwidth. The spurious component shown in the vicinity of 74 MHz is caused due to the influence of the reflected light from the optical connector of the front end of a pigtail fiber of the FP-LD. On the other hand, as to the spectrum in the temperature where deterioration hardly occurs (shown in FIG. 9), it can be seen that its spectrum line width is widened to approximately 236 MHz in the 3 dB bandwidth. Considering that the spectrum line width shows the coherence of the optical signal, it can be thought that when the spectrum line width is narrow, reflected return light by Rayleigh scattering interferes with the optical signal in the LD to deteriorate the IM3 and RIN characteristics, while when the spectrum line width is wide, IM3 and RIN characteristics hardly deteriorate because coherence of the optical signal is low even with reflected return light by Rayleigh scattering. Thus, that IM3 and RIN have temperature dependencies has been experimentally explained.

Figure 10:
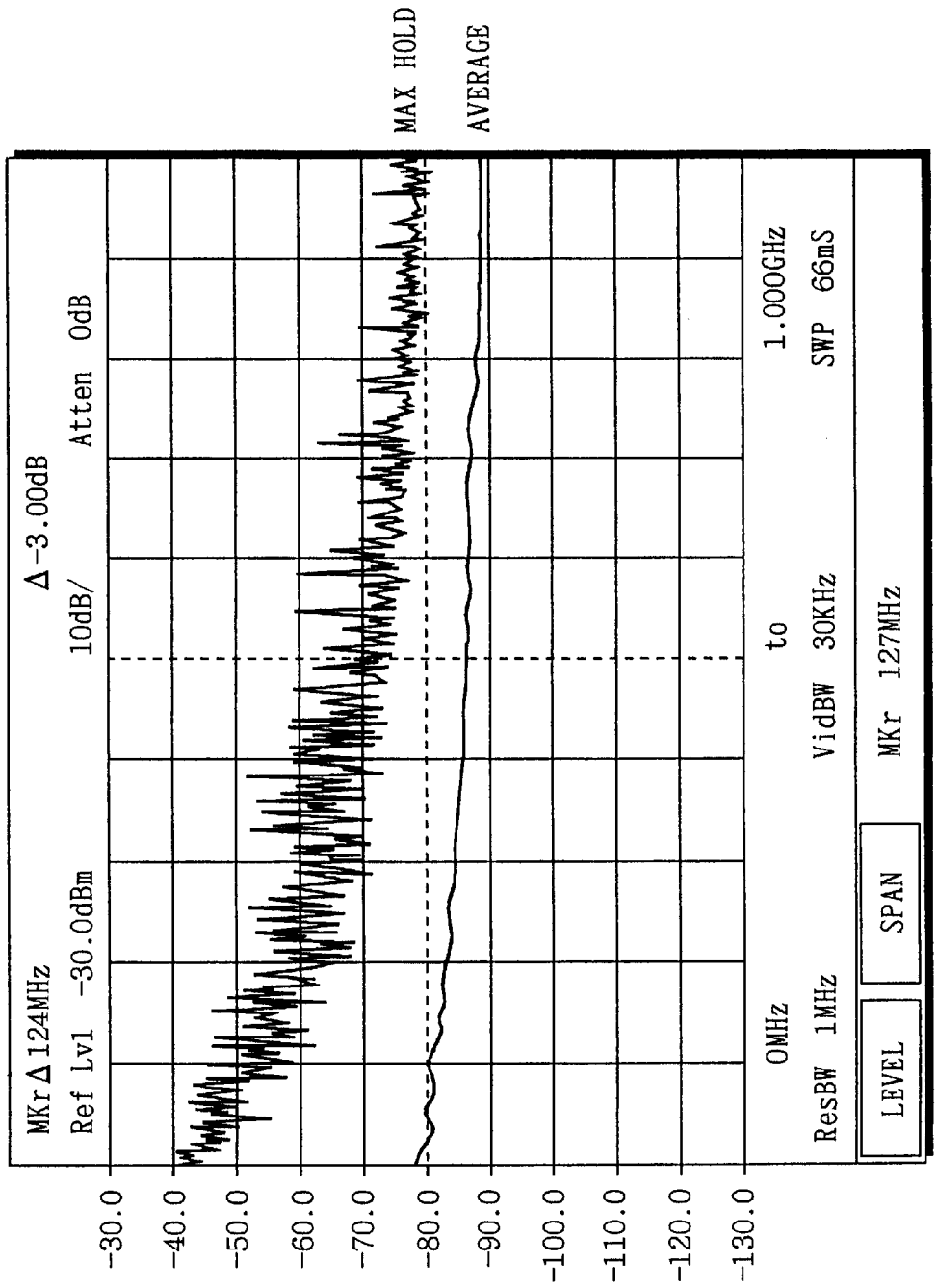
FIG. 10 is a diagram showing a spectrum of the FP-LD in the vicinity of 25 to 27.5° C. when a fiber of 2 km is connected to the FP-LD.
Figure 11:
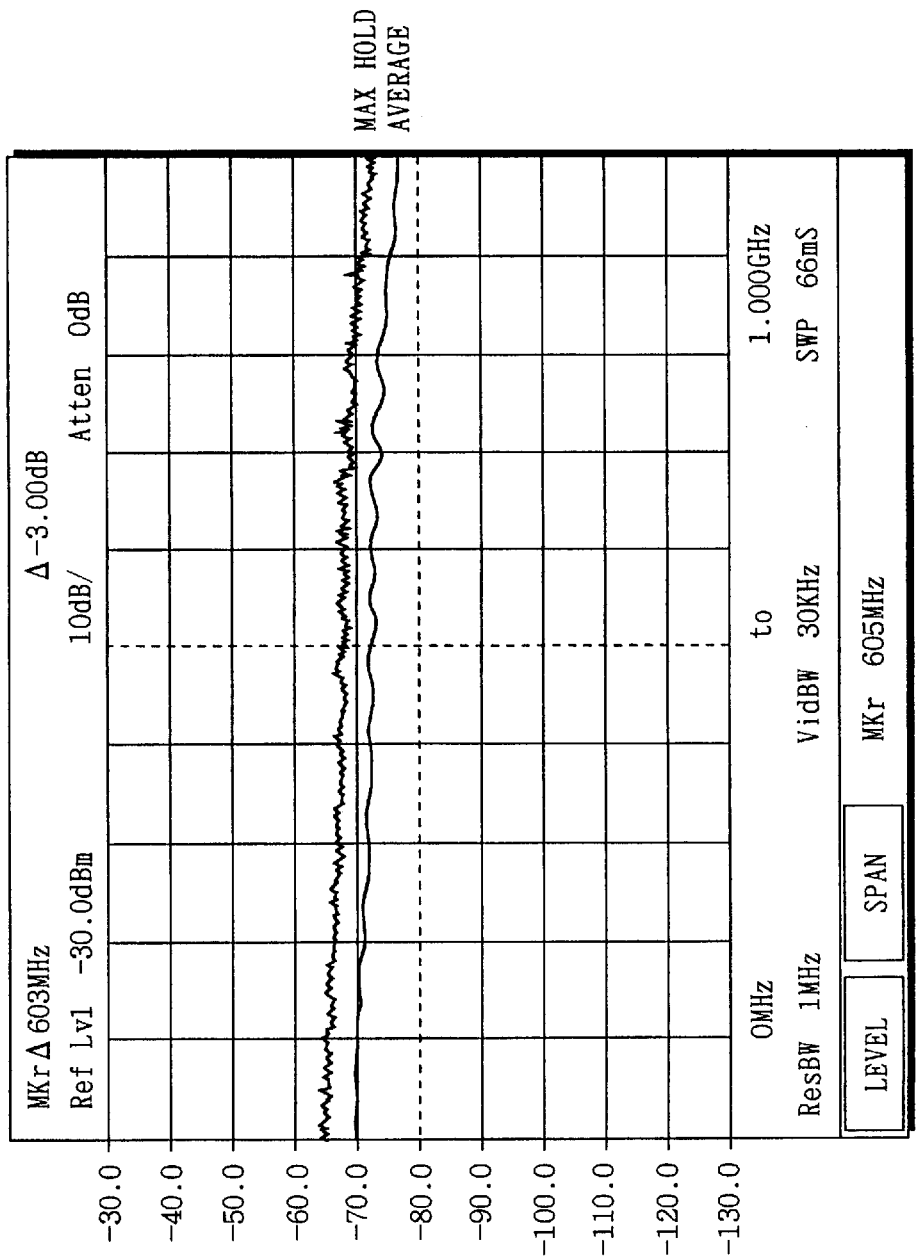
FIG. 11 is a diagram showing a spectrum of the FP-LD in the vicinity of 21 to 22° C. when the fiber of 2 km is connected to the FP-LD.

Further, when the optical fiber of 2 km is connected to the FP-LD, the spectrum line width of the FP-LD was also measured in the same manner as described above. The results of measurement are shown in FIG. 10 and FIG. 11. FIG. 10 shows a spectrum of the FP-LD in the vicinity of 25 to 27.5° C. when the fiber of 2 km is connected to the FP-LD, and FIG. 11 shows a spectrum of the FP-LD in the vicinity of 21 to 22° C. when the fiber of 2 km is connected to the FP-LD. Shown in FIG. 10 and FIG. 11 are the average values and the max hold values. In FIG. 10 and FIG. 11, the spectrum in the vicinity of 25 to 27.5° C. where both IM3 and RIN greatly deteriorate (shown in FIG. 10) is extremely unstable due to the influence of reflected return light. On the other hand, the spectrum in the vicinity of 21 to 22° C. where deterioration hardly exists (shown in FIG. 11) is almost the same as the spectrum when no optical fiber is connected (shown in FIG. 9), that is, the spectrum is stable. Thus, we confirmed that increasing the spectrum of the optical signal by adding the additional signal brings an effect of suppressing deterioration of the IM3 characteristic and the RIN characteristic.

(Second Embodiment)

Figure 12:
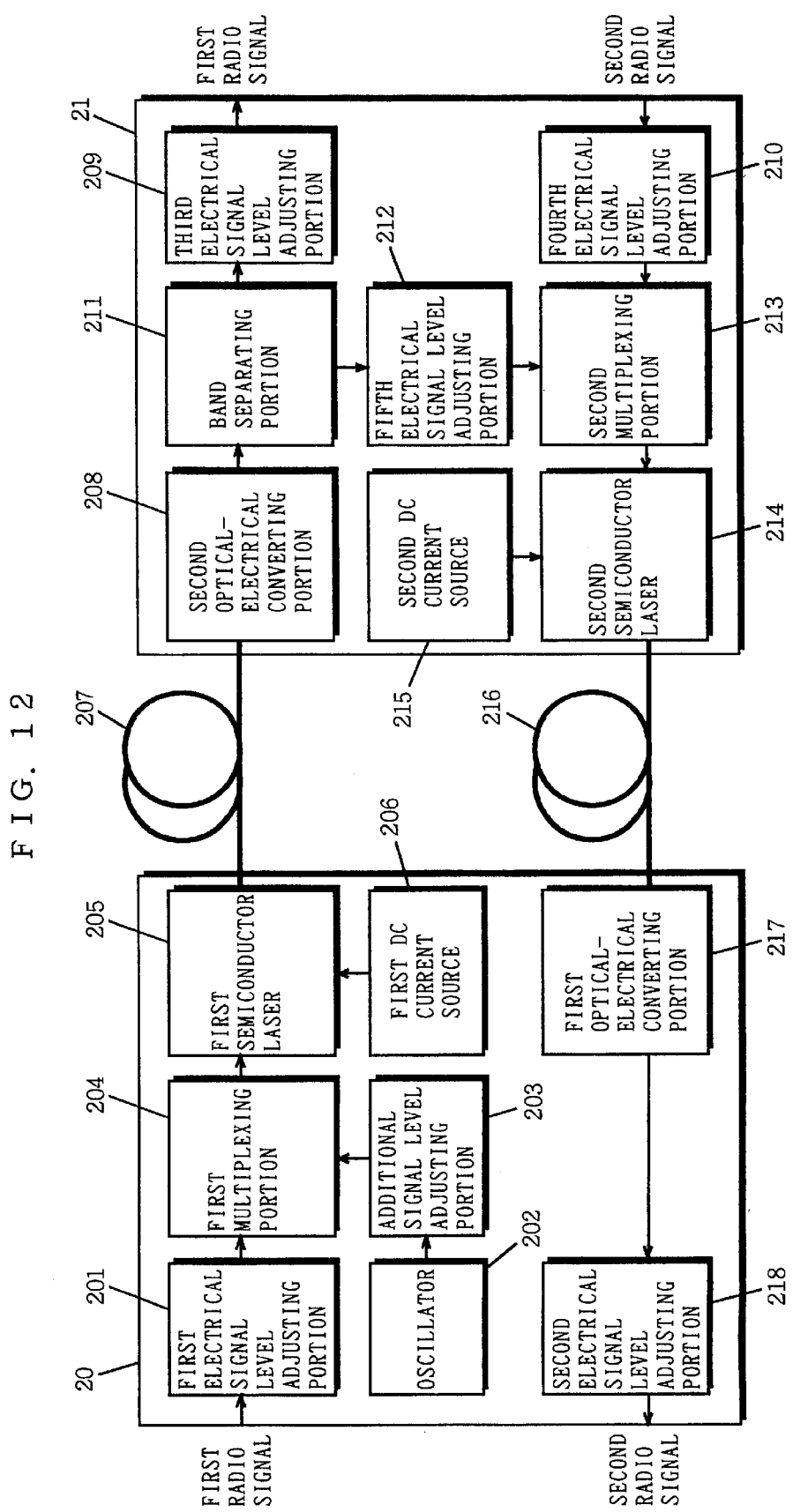
FIG. 12 is a block diagram showing the structure of an optical transmission system according to a second embodiment of the present invention.

FIG. 12 is a block diagram showing an optical transmission system according to a second embodiment of the present invention. The system in FIG. 12 includes a center side device 20, a base station device 21 and optical fibers 207 and 216. The center side device 20 includes a first electrical signal level adjusting portion 201, an oscillator 202, an additional signal level adjusting portion 203, a first multiplexing portion 204, a first semiconductor laser 205, a first DC current source 206, a first optical-electrical converting portion 217 and a second electrical signal level adjusting portion 218. The base station device 21 includes a second optical-electrical converting portion 208, a third electrical signal level adjusting portion 209, a fourth electrical signal level adjusting portion 210, a band separating portion 211, a fifth electrical signal level adjusting portion 212, a second multiplexing portion 213, a second semiconductor laser 214 and a second DC current source 215.

In FIG. 12, a first radio signal to be transmitted from the center side device 20 to the base station device 21 is inputted to the first electrical signal level adjusting portion 201 to be adjusted at a prescribed level therein. Further, a sine wave (an additional signal) is outputted from the oscillator 202 and then adjusted in the additional signal adjusting portion 203 at a prescribed level. Outputs from the first electrical signal level adjusting portion 201 and the additional signal level adjusting portion 203 are multiplexed by frequency division multiplexing in the first multiplexing portion 204. Then, a signal outputted from the first multiplexing portion 204 and a DC bias current outputted from the first DC current source 206 directly intensity-modulate an optical signal of the first semiconductor laser 205. The modulated optical signal outputted from the first semiconductor laser 205 is transmitted through the optical fiber 207 to the base station device 21. The transmitted optical signal is converted in the second optical-electrical converting portion 208 to an electrical signal and then separated in the band separating portion 211 into the radio signal and the additional signal, the radio signal being provided for the third electrical signal level adjusting portion 209 and the additional signal being provided for the fifth electrical signal level adjusting portion 212. The radio signal provided for the third electrical signal level adjusting portion 209 is adjusted therein at a prescribed level, and then outputted as the first radio signal.

Described above is transmitting operation from the center side device 20 to the base station device 21 of the system in FIG. 12. In this case, the additional signal level adjusting portion 203 adjusts the level of the additional signal from the oscillator 202 so that the frequency modulation index by the additional signal of the optical signal outputted from the first semiconductor laser 205 can be not less than 1.7, and then the first multiplexing portion 204 frequency-division-multiplexes the first radio signal and the additional signal, allowing reduction in the amount of noise or distortion which occurs by converting the wavelength variation into intensity modulation by the reflection in the optical fiber. This is the same effect as described in the first embodiment.

On the other hand, a second radio signal to be transmitted from the base station device 21 to the center side device 20 is inputted to the fourth electrical signal level adjusting portion 210 to be adjusted at a prescribed level therein. The additional signal separated in the band separating portion 211 and then provided for the fifth electrical signal level adjusting portion 212 is adjusted at a prescribed level therein. Then, output from the fourth electrical signal level adjusting portion 210 and output from the fifth electrical signal level adjusting portion 212 are multiplexed in the second multiplexing portion 213 by frequency-division-multiplexing. Then, a signal outputted from the second multiplexing portion 213 and a DC bias current outputted from the DC current source 215 directly intensity-modulate an optical signal of the second semiconductor laser 214. The modulated optical signal outputted from the second semiconductor laser 214 is transmitted through the optical fiber 216 to the center side device 20. The transmitted optical signal is converted in the first optical-electrical converting portion 217 into an electrical signal, further adjusted at a prescribed level in the second electrical signal level adjusting portion 218, and then outputted as the second radio signal.

Described above is transmitting operation from the base station device 21 to the center side device 20 of the system in FIG. 12. In this case, the fifth electrical signal level adjusting portion 212 adjusts the level of the additional signal obtained by separating in the band separating portion 211 so that the frequency modulation index by the additional signal of the optical signal outputted from the second semiconductor laser 214 can be not less than 1.7, and then the second multiplexing portion 213 frequency-division-multiplexes the second radio signal and the additional signal, allowing reduction in the amount of noise or distortion which occurs by converting wavelength variation into intensity modulation by reflection in the optical fiber 216. This is also the same effect as described in the first embodiment.

In this way, individually considering the case of transmitting a radio signal from the center side device 20 to the base station device 21 and the case of transmitting a radio signal from the base station device 21 to the center side device 20, the system in FIG. 12 has the same structure as that in the first embodiment. Therefore, in transmission either in the forward or backward direction, the same effect can be obtained as that in the first embodiment.

In addition, the oscillator 202 is installed only in the center side device 20, allowing reduction in the amount of noise or distortion which occurs by reflection in the optical fibers (207 and 216) in not only the case of transmitting a radio signal from the center side device 20 to the base station device 21 but also the case of transmitting a radio signal from the base station device 21 to the center side device 20.

If different oscillation wavelengths are allotted to the first semiconductor laser 205 and the second semiconductor laser 214, instead of two optical fibers (207 and 216), only one optical fiber is enough for bilateral communications, which can efficiently use the optical transmission path. In this case, it is required to provide an optical multiplexer/demultiplexer for multiplexing/demultiplexing the optical signal outputted from the first semiconductor laser 205 and the optical signal outputted from the second semiconductor laser 214 for both ends of the above one optical fiber.

(Third Embodiment)

Figure 13:
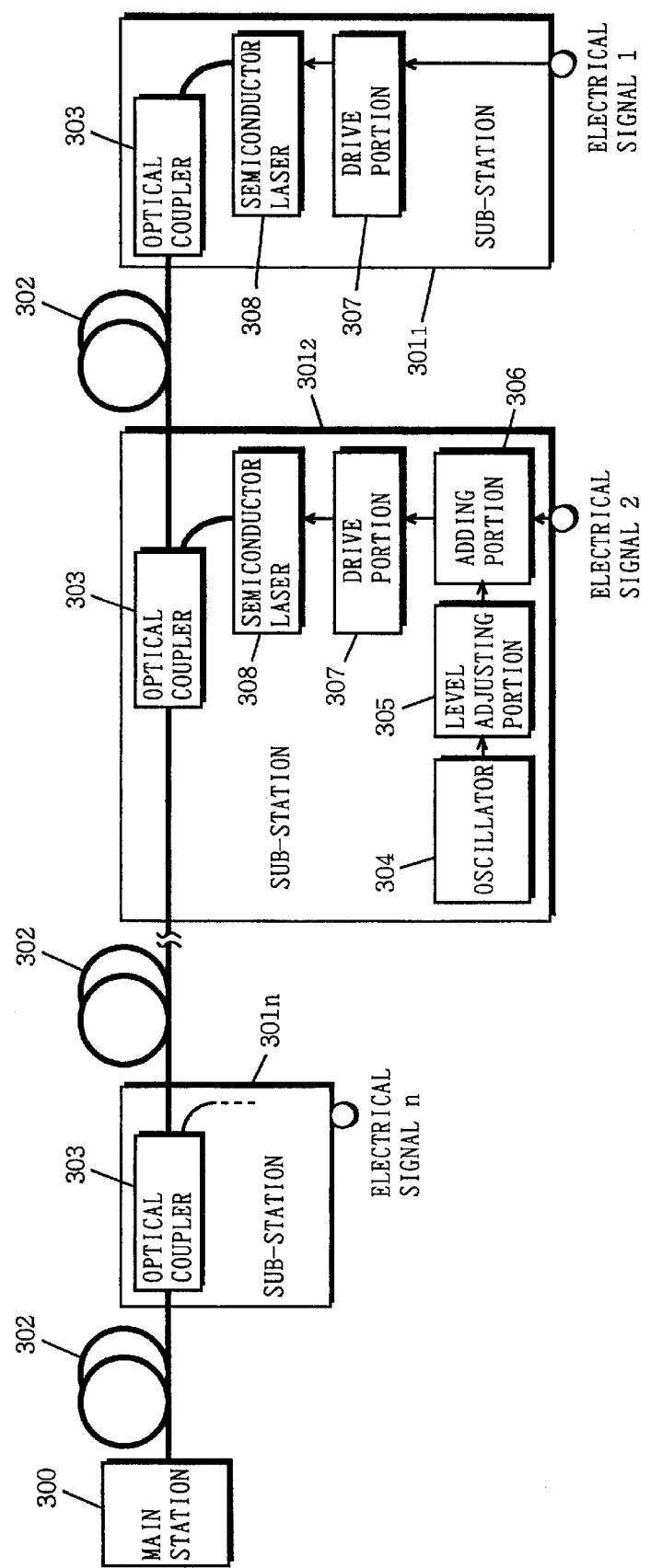
FIG. 13 is a block diagram showing the structure of an optical transmission system according to a third embodiment of the present invention.

FIG. 13 is a block diagram showing the structure of an optical transmission system according to a third embodiment of the present invention. The system in FIG. 13 includes a main station 300, sub-stations $301_1$ to $301_n$ (n is an arbitrary even number not less than 2) and an optical fiber 302. Among the above sub-stations $301_1$ to $301_n$, each sub-station $301_{(2k)}$ (k=1, 2, ..., n/2) includes an optical coupler 303, an oscillator 304, a level adjusting portion 305, an adding portion 306, a drive portion 307 and a semiconductor laser 308. Each sub-station $301_{(2k-1)}$ includes the optical coupler 303, the drive portion 307 and the semiconductor laser 308. However, the numbers 1 to n provided for each sub-station coincide with the order when the above all sub-stations are arranged in order of wavelengths of the optical signals emitted thereby.

Each of the sub-stations $301_1$ to $301_n$ belongs to the same wavelength band and emits an optical signal with a different wavelength than each other. The optical fiber 302 transmits the optical signal. The main station 300 photoreceives the transmitted optical signal. The oscillator 304 outputs an additional signal. The level adjusting portion 305 adjusts the level of the additional signal. The adding portion 306 adds the electrical signal and the additional signal. The drive portion 307 adds a DC bias current to the electrical signal. The semiconductor laser 308 outputs the optical signal which is directly intensity-modulated by the electrical signal. The optical coupler 303 mixes the optical signal.

Described below is operation of mixing and then transmitting an optical signal which is directly intensity-modulated by an electrical signal to be transmitted by the system in FIG. 13. In the sub-station $301_{(2k)}$, the oscillator 304 outputs an additional signal, and the level adjusting portion 305 adjusts the level of the additional signal. The adding portion 306 adds the electrical signal (electrical signal 2k) to be transmitted by its own station and the additional signal obtained by level-adjusting by the level adjusting portion 305. Next, the drive portion 307 adds a DC bias current to the electrical signal obtained by adding by the adding portion 306, and the semiconductor laser 308 outputs the optical signal which is directly intensity-modulated by the electrical signal obtained by adding the DC bias current thereto.

On the other hand, in the sub-station $301_{(2k-1)}$, the drive portion 307 adds the DC bias current to the electrical signal to be transmitted (electrical signal 2k–1), and the semiconductor laser 308 outputs the optical signal which is directly intensity-modulated by the electrical signal obtained by adding the DC bias current thereto.

The optical signals emitted from the sub-stations $301_1$ to $301_n$ in the above described manner are mixed in the optical coupler 303 and then transmitted through the optical fiber 302 to the main station 300. The main station 300 photoreceives the transmitted optical signal. The photoreceived optical signal is optical-electrical-converted and then separated into electrical signals 1 to n as required.

In the above operation, at the time of optical-electrical conversion, when the frequency of a beat wave between the optical signals with wavelengths most adjacent to each other, such as the optical signal emitted by the sub-station $301_1$ and the optical signal emitted by the sub-station $301_2$, coincides with or is extremely close to any of the frequency of the electrical signals 1 to n due to the influence of environmental temperature changes, etc., the beat wave becomes OBI noise to have the adverse effect on optical transmission. The same goes for the optical signal emitted by the sub-station $301_2$ and the optical signal emitted by the sub-station $301_3$. Further, the same goes for the optical signal emitted by the sub-station $301_3$ and the optical signal emitted by the sub-station $301_4$, and the optical signal emitted by the sub-station $301_{(n-1)}$ and the optical signal emitted by the sub-station $301_n$. Since these OBI noises are equal, described below is operation of suppressing the OBI noise by the beat wave between the optical signal emitted by the sub-station $301_1$ and the optical signal emitted by the sub-station $301_2$.

In the second sub-station $301_2$, the semiconductor laser 308 is subjected to frequency modulation simultaneously when subjected to intensity modulation. Therefore, an additional signal is added to disperse the spectrum of the optical signal into a plurality of modes. At this time, if the frequency modulation index is sufficiently large, power of each mode of the optical signal becomes approximately a value obtained by dividing the power at the time of no dispersion by the number of modes. Therefore, if the frequency of the beat wave of the optical signals outputted from the sub-station $301_1$ and the sub-station $301_2$ coincides with or is extremely close to any one of the electrical signals 1 to n to cause OBI noise by the beat wave, it is possible to reduce the power of the occurred OBI noise. When the spectrum line width of the optical signal is wider than the band of the electrical signal, the power of the OBI noise can be reduced to approximately a value obtained by dividing the power at the time of no dispersion by the number of modes.

Here, the above number of modes is the maximum integer not more than a value obtained by adding 1 to a value (=β) obtained by dividing the maximum frequency deviation by the additional signal by the frequency of the additional signal. Therefore, in order to multiply the power of each mode of the OBI noise by Q (where Q<1), β is made not less than 1/Q. The above β is generally called a frequency modulation index, and given by the above equation (1) where the frequency of the additional signal is f, the optical modulation index of the additional signal is m, the light emitting threshold current is $I_{th}$, the DC bias current is $I_b$, and the frequency modulation efficiency is dF/dI (refer to the first embodiment).

On the other hand, the optical modulation index m is determined by the level of the additional signal. Therefore, in the system of FIG. 13, when the light emitting threshold current, the DC bias current and the frequency modulation efficiency of the semiconductor laser 308 and the additional signal frequency are values in prescribed ranges respectively, the level of the additional signal is adjusted so that the frequency modulation index β can be not less than 1/Q. This allows reduction in power of the OBI noise to Q times.

For example, when each of the above parameters are set such as $(I_b-I_{th})$=50 mA, dF/dI=200 MHz/mA, f=20 MHz, the level adjusting portion 305 adjusts the level of the additional signal so that the optical modulation index m of the additional signal can be 0.2, which makes β=100 and allows reduction in power of the OBI noise to approximately 1/100. In the system of FIG. 13, needless to say, if the elements of the sub-station $301_{(2k)}$ and the elements of the sub-station $301_{(2k-1)}$ are interchanged each other, the same result can be obtained as the above result.

Figure 14:
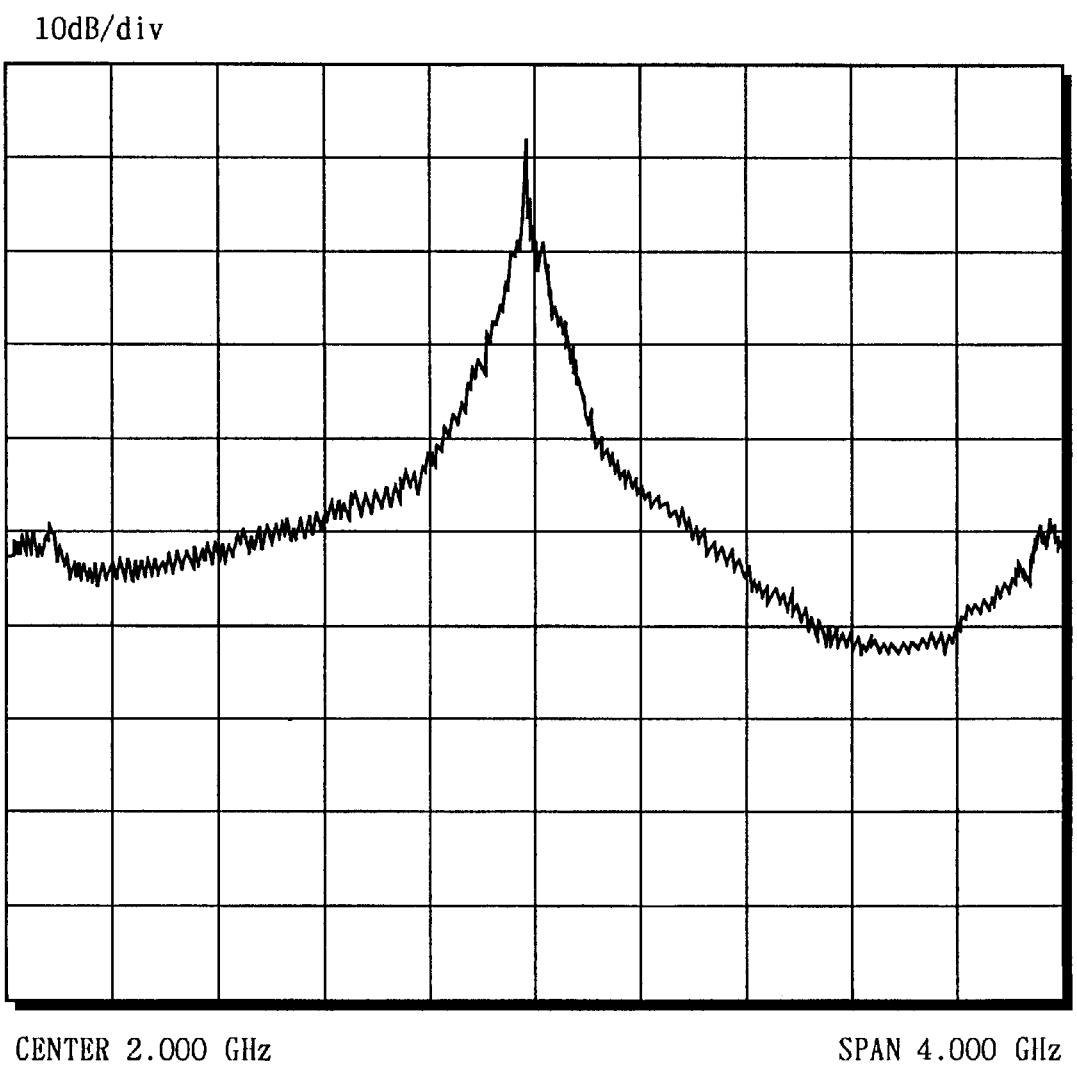
FIG. 14 is a diagram showing a spectrum of OBI noise when neither of the FP-LD nor a wavelength variable light source is modulated.
Figure 15:
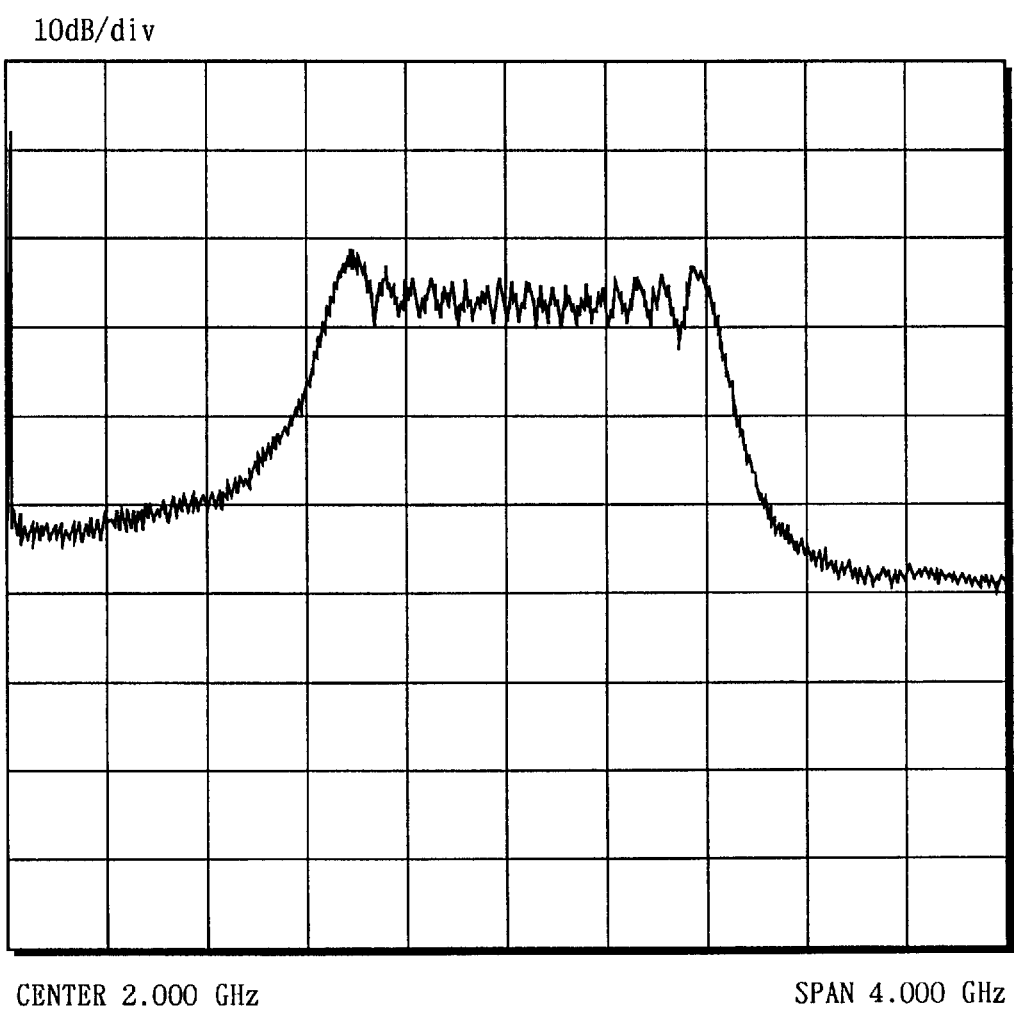
FIG. 15 is a diagram showing a spectrum of OBI noise, when the wavelength variable light source is not modulated and an additional signal is added to the FP-LD so that the frequency modulation index can become 27.8.

Measurement results actually confirmed regarding the OBI noise reduction effect of the present invention are shown in FIG. 14 and FIG. 15. We used an FP-LD and a wavelength variable light source as light sources and observed the spectrum of the OBI noise through a spectrum analyzer. FIG. 14 shows a spectrum of the OBI noise when neither the FP-LD nor the wavelength variable light source is modulated, and FIG. 15 shows a spectrum of the OBI noise when the wavelength variable light source is not modulated and an additional signal is added to the FP-LD so that the frequency modulation index can become 27.8. In FIG. 14 and FIG. 15, it can be seen that when no additional signal is added, the OBI noise of extremely large power occurs in the frequency of the difference between two optical frequencies (FIG. 14). Therefore, when the frequency of the OBI noise coincides with or is adjacent to the frequency of the electrical signal to be transmitted, its effect becomes extremely large. On the other hand, it can be seen that when an additional signal is added, because the FP-LD is frequency modulated by the additional signal and directly intensity-modulated simultaneously, the spectrum of the OBI noise is spread out in a wide range (FIG. 15). In this case, it can also be seen that the frequency modulation index β is β>>1 and each mode is approximately equal. The bandwidth of the transmission frequency band of the electrical signal to be transmitted is several tens of KHz for a signal for cellular telephones and 6 MHz for cable television signals, and is narrower than the spectrum line width of the light source with bandwidth of several tens of MHz. Therefore, it can be seen that as in FIG. 15, the additional signal is added to enlarge the frequency range of the noise band, allowing reduction in the maximum values of the noise which affects the transmission band of the electrical signal to be transmitted.

Needless to say, when the total number of the sub-stations n is an odd number not less than 3, the same effect as the above can be obtained. However, in this case, among the sub-stations $301_1$ to $301_n$, the structure in which the sub-station $301_{(2k)}$ (where k=1, 2, . . . , (n-1)/2) includes the optical coupler 303, the oscillator 304, the level adjusting portion 305, the adding portion 306, the drive portion 307 and the semiconductor laser 308 and the sub-station $301_{(2k-1)}$ includes the optical coupler 303, the drive portion 307 and the semiconductor laser 308 is smaller in size than the structure in which the sub-station $301_{(2k-1)}$ includes the optical coupler 303, the oscillator 304, the level adjusting portion 305, the adding portion 306, the drive portion 307 and the semiconductor laser 308 and the sub-station $301_{(2k)}$ includes the optical coupler 303, the drive portion 307 and the semiconductor laser 308.

As can be seen from the above description, in the system of FIG. 13, the basic operation as to drive of the semiconductor lasers is the same as that described in the first embodiment. Therefore, also in the system of FIG. 13, the FP-LD can be used as the semiconductor laser, and therefore the cost of the system can be greatly reduced compared to the conventional case of using the DFB-LD. Further, when the FP-LD is adapted as the semiconductor laser 308, the effect of reduction in the OBI noise by multi-mode oscillation is added, and thereby obtaining further more effect of reduction.

In the present embodiment, although described is the case where the connection form between the main station 300 and each of the sub-stations $301_1$ to $301_n$ is a bus form, it goes without saying that the same effect can be obtained in the case of a tree form. In this case, the optical coupler 303 in each of the sub-stations $301_1$ to $301_n$ is not required, and an optical coupler for mixing the optical signals transmitted from each of the sub-stations $301_1$ to $301_n$ is required instead, in or in the vicinity of the main station 300. In the bus form, since the required optical transmission path is appeared to be one, the optical transmission path can be effectively used compared to that in the tree form. Further, it goes without saying that the same effect can be obtained for reduction in the OBI noise even in the connection form of mix of a tree form and the bus form, and thereby the sub-stations can be flexibly arranged.

(Fourth Embodiment)

Figure 16:
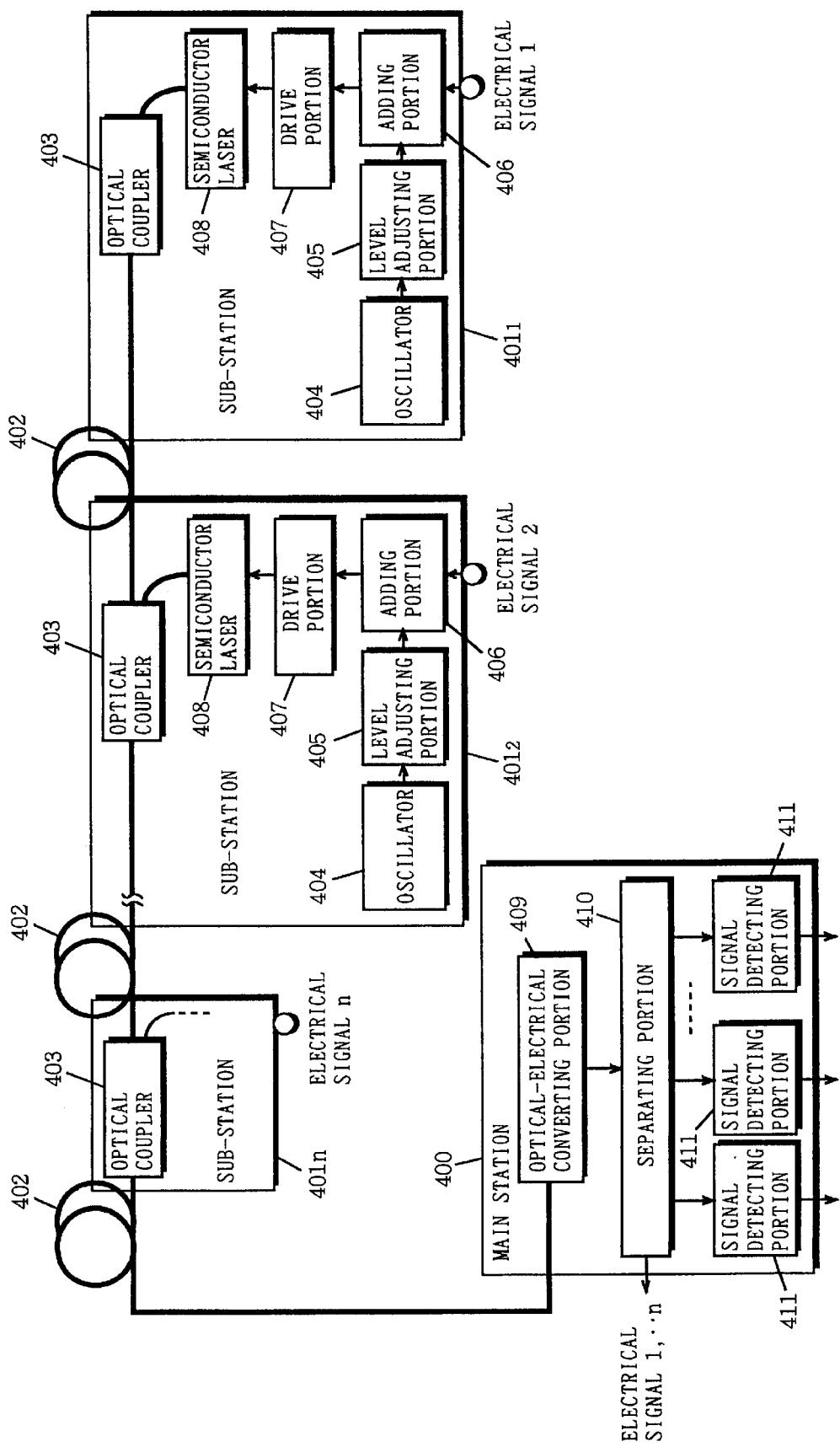
FIG. 16 is a block diagram showing the structure of an optical transmission system according to a fourth embodiment of the present invention.
Figure 17:
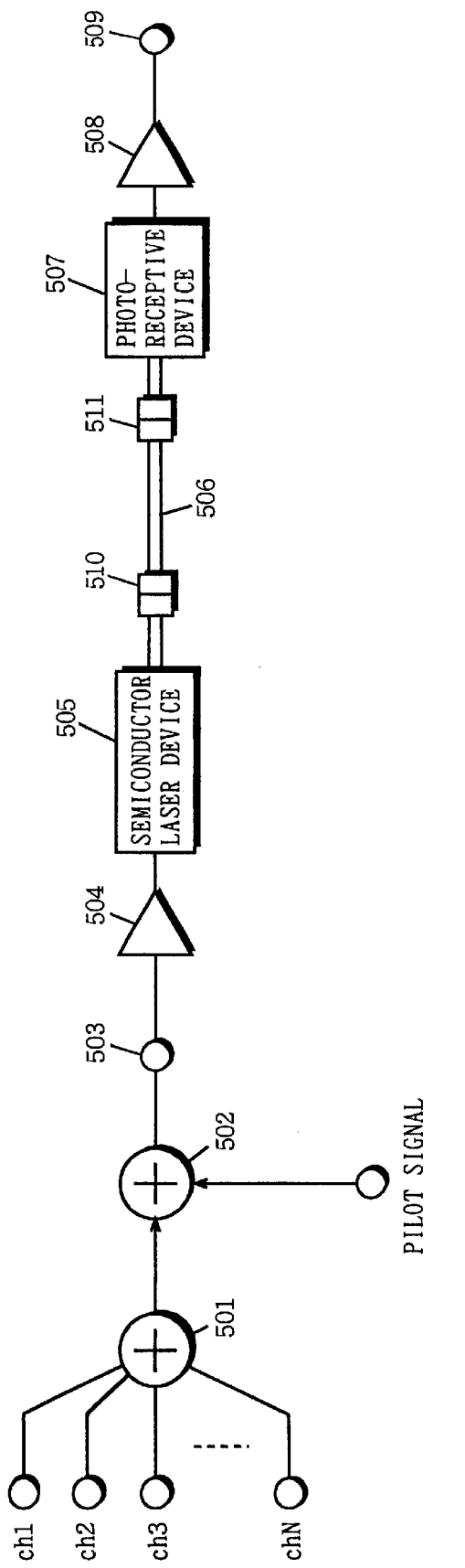
FIG. 17 is a block diagram showing an example of structure of the conventional optical transmission device.
Figure 18:
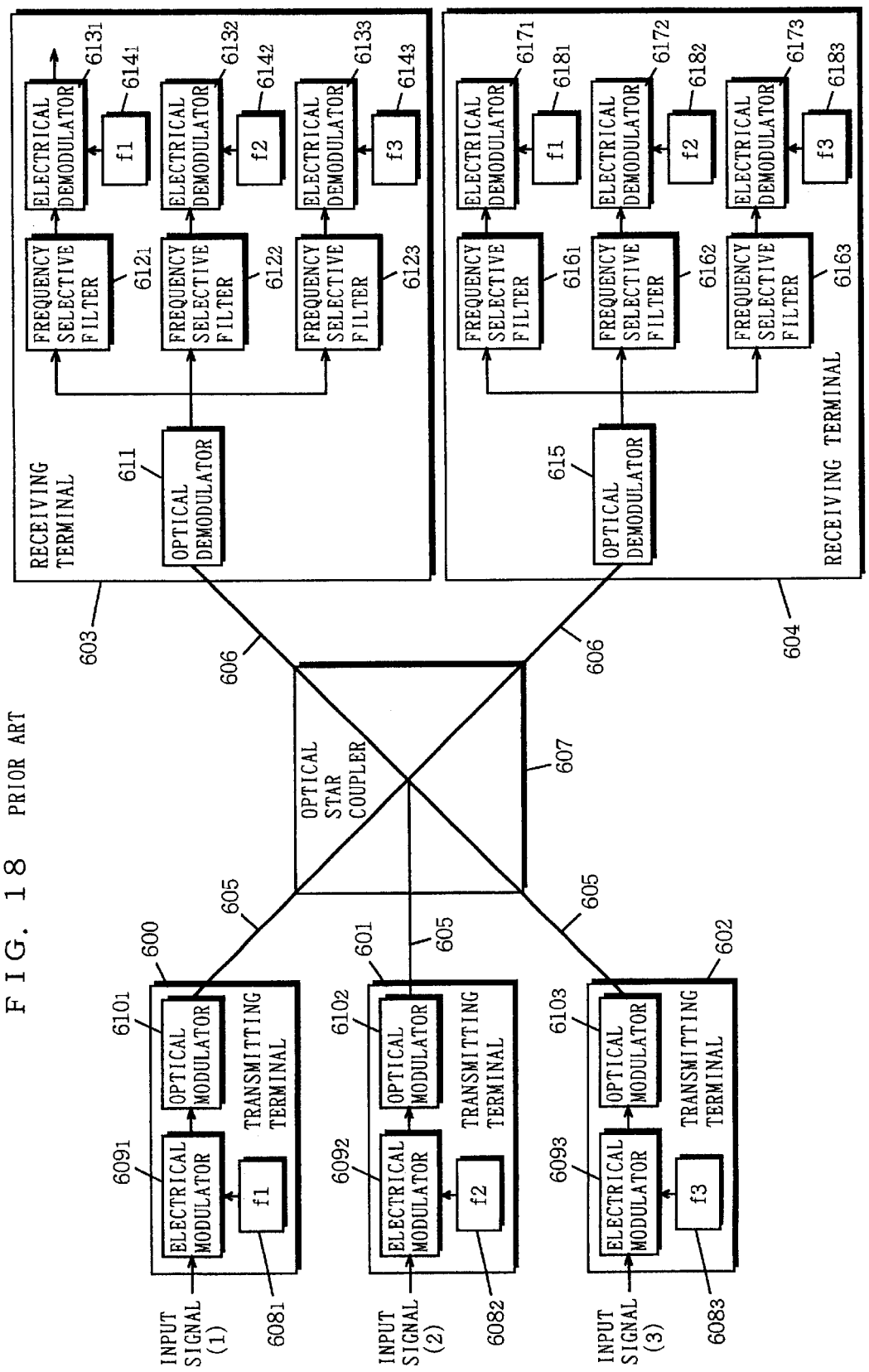
FIG. 18 is a block diagram showing an example of structure of the conventional optical transmission system.

FIG. 16 is a block diagram showing the structure of an optical transmission system according to a fourth embodiment of the present invention. The system in FIG. 16 includes a main station 400, sub-stations $401_1$ to $401_n$ (n is an arbitrary integer not less than 2), and an optical fiber 402. Each of the sub-stations $401_1$ to $401_n$ includes an optical coupler 403, an oscillator 404, a level adjusting portion 405, an adding portion 406, a drive portion 407, and a semiconductor laser 408. The main station 400 includes an optical-electrical converting portion 409, a separating portion 410, and a plurality of signal detecting portions 411.

The optical-electrical converting portion 409 converts an optical signal into an electrical signal. The separating portion 410 separates the electrical signal obtained by converting by the optical-electrical converting portion 409 into the electrical signal to be transmitted and additional signals. Each signal detecting portion 411 detects a signal outputted from each oscillator 404 in the sub-stations $401_1$ to $401_n$, from the additional signals obtained by separation by the separating portion 410. The other elements perform the same operations as the corresponding elements of the system in FIG. 13.

Described below is operation of mixing and then transmitting an optical signal directly intensity-modulated by an electrical signal to be transmitted by the system in FIG. 16. In the sub-stations $401_1$ to $401_n$, the oscillator 404 outputs an additional signal, and the level adjusting portion 405 adjusts the level of the additional signal. The adding portion 406 adds the electrical signals to be transmitted (first to n-th electrical signals) and their additional signals. Next, the drive portion 407 adds a DC bias current to the electrical signal obtained by adding by the adding portion 406, and the semiconductor laser 408 outputs the optical signal directly intensity-modulated by the electrical signal obtained by adding the DC bias current.

The optical signals outputted from each of the sub-stations $401_1$ to $401_n$ in the above manner are mixed in the optical coupler 403 and then transmitted through the optical fiber 402 to the main station 400 side. In the main station 400, the optical-electrical converting portion 409 converts the transmitted optical signal into an electrical signal. Then, the separating portion 410 separates the electrical signal obtained by converting into the electrical signals to be transmitted (first to n-th electrical signals) and the additional signals. The signal detecting portion 411 detects the signal outputted form each of the oscillator 404 in the sub-station $401_1$ to $401_n$ from the additional signals obtained by separation. Detection can be made, for example, by comparing the frequency of the additional signal obtained by separating to the frequency of the signal outputted from each of the oscillators 404 in the sub-stations $401_1$ to $401_n$.

In the above operation, as is the same in the system of FIG. 13, at the time of optical-electrical conversion, OBI noise of the beat wave is caused between the optical signals when their wavelengths are adjacent to each other. The operation of suppressing the OBI noise is the same as that described in the third embodiment. That is, since the semiconductor laser 408 is subjected to direct intensity-modulation and frequency modulation simultaneously, it disperses the spectrum of the optical signal into a plurality of modes by adding an additional signal. At this time, power of each mode of the optical signal becomes approximately a value obtained by dividing the power without dispersing by the number of modes.

However, in the system of FIG. 13, one of the optical signals whose wavelengths are adjacent to each other is subjected to mode dispersion, while in the system in FIG. 16, both of them are subjected to mode dispersion. Thus, in order to multiply the power of each mode of the OBI noise by Q (where Q<1), β is made not less than 1/(2Q). Therefore, in the system of FIG. 16, when the light emitting threshold current, the DC bias current and the frequency modulation efficiency of the semiconductor laser 408 and the frequency of the additional signal take values within prescribed ranges, the level of the additional signal is adjusted so that the frequency modulation index β can become not less than 1/(2Q). This can reduce the power of the OBI noise to Q times.

Further, in the system of FIG. 16, failure of each of the sub-stations $401_1$ to $401_n$ or a broken portion of the optical fiber 401 can be recognized whenever it occurs in the main station 400 side as in the following manner. That is, for example, when the signal detecting portion 411 cannot detect the additional signal outputted from the oscillator 404 of the sub-station $401_1$, the main station 400 can recognize the possibility of failure of the sub-station $401_1$. Further, when the signal detecting portion 411 cannot detect the additional signal outputted from the oscillator 404 of the sub-station $401_1$ even though having detected the additional signal outputted from the oscillator 404 of the sub-station 4012, in addition to the possibility of failure of the sub-station $401_1$, the possibility of cut of the optical fiber 402 between the sub-station $401_1$ and the sub-station $401_2$ can be recognized.

In this way, the system of FIG. 16 can recognize whether the additional signals outputted from each of the oscillator 404 in the sub-stations $401_1$ to $401_n$ are transmitted to the main station 400, and thereby the main station 400 side can assume failure of the sub-stations $401_1$ to $401_n$, a broken portion of the optical fiber 402, etc. whenever it occurs. Unlike the third embodiment, this is an effect firstly obtained by structuring all sub-stations $401_1$ to $401_n$ in such a way that an additional signal is added to the electrical signal to be transmitted.

Further, when the present embodiment is compared to the first embodiment, drive of the semiconductor laser 408 is basically the same as in the first embodiment. Therefore, an FP-LD can be used as the semiconductor laser 408, allowing great reduction in cost of the system compared to a DFB-LD in use as in the conventional case. Furthermore, when the FP-LD is used as the semiconductor laser 408, a reduction effect of the OBI noise by multi-mode oscillation is added, and thereby a further more reduction effect can be obtained. Also, the other effects obtained in the first embodiment can be obtained.

Further, when the OBI noise which occurs by the maximum modes of the FP-LD affects sub-carriers, in the transmission system requiring a transmission characteristic of high quality, the OBI noise may seriously deteriorate the transmission characteristic. In such case, it can be thought that wavelength selection is previously performed to use each FP-LD in the sub-stations $401_1$ to $401_n$ whose central wavelengths are separated at a certain interval with respect to each other. By using FP-LDs whose central wavelength are separated at a certain interval with respect to each other, the OBI noise brought by deterioration of the transmission characteristic occurs only between each of the side modes of the FP-LDs, and thereby deterioration of the transmission characteristic is small compared to the case with the OBI noise between each of maximum modes. Further in this case, when the total number of the sub-stations (connected to one optical fiber 402) is 3, it is enough to allocate three wavelength regions at the time of wavelength selection of the FP-LD. For example, suppose that central wavelengths are needed to be separated at not less that 10 nm. First, a center wavelength region is determined, then wavelength space of 10 nm is taken on both sides thereof, and thereby all FP-LDs whose central wavelengths are separated at not less than 10 nm can be used. In this case, since limit of regions is only on one side except in the center wavelength regions, wavelength selection can be easily performed.

Further, in the present embodiment, although described is the case where the connection form between the main station 400 and each of the sub-stations $401_1$ to $401_n$ takes a bus form, it goes without saying that the same effect can be obtained in the case of a tree form. In this case, the optical coupler 403 provided in each of the sub-stabons $401_1$ to $401_n$ is not required, and an optical coupler for mixing the optical signals transmitted from each of the sub-stations $401_1$ to $401_n$ is required instead, in or in the vicinity of the main station 400. In the bus form, since the required optical transmission path is appeared to be one, the optical transmission path is effectively used compared to that in the tree form. Further, it goes without saying that the same effect can be obtained for reduction in the OBI noise even in the connection form of mix of the tree form and the bus form, and thereby the sub-stations can be flexibly arranged.

While the invention has been described in detail, the foregoing description is in all aspects illustrative and not restrictive. It is understood that numerous other modifications and variations can be devised without departing from the scope of the invention.

What is claimed is:

1. An optical transmission device for converting an electrical signal into an optical signal directly intensity-modulated by the electrical signal and then transmitting the optical signal, comprising:

an oscillator operable to output an additional signal, a multiplexing portion operable to multiplex the electrical signal to be transmitted and the additional signal outputted from said oscillator, a DC current source operable to output a DC bias current, a semiconductor laser operable to output an optical signal directly intensity-modulated by a signal obtained by mixing an electrical signal obtained by multiplexing by said multiplexing portion and the DC bias current outputted from said DC current source, an optical transmission path operable to transmit the optical signal outputted from said semiconductor laser, and an optical-electrical converting portion operable to convert the optical signal transmitted through said optical transmission path into an electrical signal, wherein said oscillator is operable to output the additional signal with a frequency which is higher than a frequency corresponding to a widest bandwidth of a frequency band allotted to the electrical signal to be transmitted and lower than a half of a lowest frequency of a frequency band allotted to the electrical signal to be transmitted.

2. The optical transmission device according to claim 1, wherein
   said semiconductor laser is a Fabry-Perot-type semiconductor laser.

3. The optical transmission device according to claim 2, wherein
   the additional signal outputted from said oscillator is modulated by any data.

4. The optical transmission device according to claim 3, wherein
   said Fabry-Perot-type semiconductor laser has such a chip structure that an active layer having an amplifying function of the optical signal and a spot size converting portion for narrowing an angle of emission of the outputted optical signal are formed on a same substrate.

5. The optical transmission device according to claim 4, wherein
   the electrical signal to be transmitted is a signal obtained by frequency-division-multiplexing one or more radio signals for mobile communications,
   one or more contiguous frequency bands are allotted to one or more of the electrical signals to be transmitted, and
   said oscillator is operable to output an additional signal with a frequency which is higher than a frequency corresponding to a bandwidth of a widest frequency band among the one or more contiguous frequency bands and lower than a half of a lowest frequency among the one or more contiguous frequency bands.

6. The optical transmission device according to claim 5, wherein
   an electrical signal transmitted using at least one frequency band among the one or more contiguous frequency bands is a code division multiplex signal, and
   said oscillator is operable to output an additional signal with a frequency which is higher than a frequency corresponding to a widest frequency band among all of the one or more contiguous frequency bands except the frequency band allotted to the code division multiplex signal and lower than a half of a lowest frequency of the one or more contiguous frequency bands.

7. The optical transmission device according to claim 6, wherein
   said optical transmission path includes one or more optical fibers, and a position of an emission end surface of said Fabry-Perot-type semiconductor laser and that of an end surface of the optical fiber coupled thereto are set not to be parallel to each other.

8. The optical transmission device according to claim 7, further comprising:
   an additional signal level adjusting portion operable to adjust a level of the additional signal outputted from said oscillator, wherein
   said additional signal level adjusting portion is operable to adjust the level of the additional signal outputted from said oscillator so that a frequency modulation index $\beta$ of the optical signal outputted from said semiconductor laser can satisfy a conditional equation $\beta \geq (2/\pi) \cdot 10^{P/10}$ (where $\pi$ is the ratio of the circumference of a circle to its diameter) for reducing noise or distortion which occurs in this optical transmission by at least P decibels.

9. The optical transmission device according to claim 8, wherein
   said additional signal level adjusting portion is operable to adjust the level of the additional signal so that the frequency modulation index $\beta$ can satisfy a conditional equation $\beta \geq 1.7$.

10. The optical transmission device according to claim 7, wherein
    when optical modulation indexes allotted to the plurality of the electrical signals to be transmitted and the additional signal obtained by level-adjusting by said additional signal level adjusting portion are mi (i=1, 2, ..., N), a total optical modulation index $\sqrt{\{\Sigma(mi)^2\}}$ does not exceed 0.3.

11. The optical transmission device according to claim 3, wherein
    said Fabry-Perot-type semiconductor laser has such a chip structure that the active layer having an amplifying function of the optical signal is tapered.

12. The optical transmission device according to claim 11, wherein
    the electrical signal to be transmitted is a signal obtained by frequency-division-multiplexing one or more radio signals for mobile communications,
    one or more contiguous frequency bands are allotted to one or more electrical signals to be transmitted, and said oscillator is operable to output an additional signal with a frequency which is higher than a frequency corresponding to a bandwidth of a widest frequency band among the one or more contiguous frequency bands and lower than a half of a lowest frequency among the one or more contiguous frequency bands.

13. The optical transmission device according to claim 12, wherein an electrical signal transmitted using at least one frequency band among the one or more contiguous frequency bands is a code division multiplex signal, and said oscillator is operable to output an additional signal with a frequency which is higher than a frequency corresponding to a widest frequency band among all of the one or more contiguous frequency bands except the frequency band allotted to the code division multiplex signal and lower than a half of a lowest frequency of the one or more contiguous frequency bands.

14. The optical transmission device according to claim 13, wherein said optical transmission path includes one or more optical fibers, and a position of an emission end surface of said Fabry-Perot-type semiconductor laser and that of an end surface of the optical fiber coupled thereto are set not to be parallel to each other.

15. The optical transmission device according to claim 14, further comprising:

an additional signal level adjusting portion operable to adjust a level of the additional signal outputted from said oscillator, wherein said additional signal level adjusting portion is operable to adjust the level of the additional signal outputted from said oscillator so that a frequency modulation index $\beta$ of the optical signal outputted from said semiconductor laser can satisfy a conditional equation $\beta \geq (2/\pi) \cdot 10^{P/10}$ (where $\pi$ is the ratio of the circumference of a circle to its diameter) for reducing noise or distortion which occurs in this optical transmission by at least P decibels.

16. The optical transmission device according to claim 15, wherein said additional signal level adjusting portion is operable to adjust the level of the additional signal so that the frequency modulation index $\beta$ can satisfy a conditional equation $\beta \geq 1.7$.

17. The optical transmission device according to claim 14, wherein when optical modulation indexes allotted to the plurality of the electrical signals to be transmitted and the additional signal obtained by level adjusting by said additional signal level adjusting portion are mi (i=1, 2, ..., N), a total optical modulation index $\sqrt{\{\Sigma(mi)^2\}}$ does not exceed 0.3.

18. An optical transmission system for converting an electrical signal into an optical signal directly intensity-modulated by the electrical signal and then bilaterally transmitting the optical signal, comprising:

a first device operable to transmit a first electrical signal, a second device operable to transmit a second electrical signal, and an optical transmission path operable to interconnect said first device and said second device, said first device including:

an oscillator operable to output an additional signal with a frequency which is lower than a half of a lowest frequency of frequency bands allotted for transmission of the first and second electrical signals, a first multiplexing portion operable to multiplex the first electrical signal and the additional signal outputted from said oscillator, a first DC current source operable to output a DC bias current, a first semiconductor laser operable to output an optical signal directly intensity-modulated by a signal obtained by mixing by said first multiplexing portion and the DC bias current outputted by said first DC current source, and a first optical-electrical converting portion operable to convert an optical signal transmitted from said second device into an electrical signal;

said second device including:

a second optical-electrical converting portion operable to convert an optical signal transmitted from said first device into an electrical signal, a band separating portion operable to separate the electrical signal obtained by converting by said second optical-electrical converting portion into the first electrical signal and the additional signal outputted from said oscillator, a second multiplexing portion operable to multiplex the additional signal obtained by separating by said band separating portion and the second electrical signal, a second DC current source operable to output a DC bias current, and a second semiconductor laser operable to output an optical signal directly intensity-modulated by a signal obtained by mixing a signal obtained by said second multiplexing portion and the DC bias current outputted by said second DC current source; and said optical transmission path including:

a first optical fiber operable to transmit the optical signal outputted from said first semiconductor laser to said second device, and a second optical fiber operable to transmit the optical signal outputted from said second semiconductor laser to said first device.

19. An optical transmission system, comprising a main station and a plurality of sub-stations, for converting an electrical signal into an optical signal directly intensity-modulated by the electrical signal and then transmitting the optical signal from the plurality of sub-stations to the main station, said plurality of sub-stations comprise first to n-th (where n is an arbitrary even number not less than 2) sub-stations in a wavelength order of optical signals emitted from each station, and each of a 2k-th (where k=1, 2, ..., n/2) sub-station among the plurality of sub-stations comprises:

an oscillator operable to output an additional signal, a multiplexing portion operable to multiplex an electrical signal to be transmitted by the sub-station and the additional signal outputted from said oscillator, a DC current source operable to output a DC bias current, and a semiconductor laser operable to output an optical signal directly intensity-modulated by a signal obtained by mixing a signal obtained by said multiplexing portion and the DC bias current outputted from said DC current source; and each of 2k-1-th sub-stations comprises:

a DC current source operable to output a DC bias current, and a semiconductor laser operable to output an optical signal directly intensity-modulated by a signal obtained by mixing the electrical signal to be transmitted by the sub-station and the DC bias current outputted from said DC current source.

20. The optical transmission system according to claim 19, wherein
each semiconductor laser of each of said plurality of sub-stations is a Fabry-Perot-type semiconductor laser.

21. The optical transmission system according to claim 20, wherein
a connection form between said main station and said plurality of sub-stations is a bus form.

22. An optical transmission system, comprising a main station and a plurality of sub-stations, for converting an electrical signal into an optical signal directly intensity-modulated by the electrical signal and then transmitting the optical signal from the plurality of sub-stations to the main station,
said plurality of sub-stations comprise first to n-th (where n is an arbitrary odd number not less than 3) sub-stations in a wavelength order of optical signals emitted from each station, and each of a 2k-th (where k=1, 2, ..., (n−1)/2) sub-station among the plurality of the sub-stations comprises:
an oscillator operable to output an additional signal,
a multiplexing portion operable to multiplex an electrical signal to be transmitted by the sub-station and the additional signal outputted from said oscillator,
a DC current source operable to output a DC bias current, and
a semiconductor laser operable to output an optical signal directly intensity-modulated by a signal obtained by mixing a signal obtained by said multiplexing portion and the DC bias current outputted from said DC current source; and
each of a 2k-1-th sub-station comprises:
a DC current source operable to for output a DC bias current, and
a semiconductor laser operable to output an optical signal directly intensity-modulated by a signal obtained by mixing the electrical signal to be transmitted by the sub-station and the DC bias current outputted from said DC current source.

23. The optical transmission system according to claim 22, wherein
each semiconductor laser of each of said plurality of sub-stations is a Fabry-Perot-type semiconductor laser.

24. The optical transmission system according to claim 23, wherein
a connection form between said main station and said plurality of sub-stations is a bus form.

25. An optical transmission system, comprising a main station and a plurality of sub-stations, for converting an electrical signal into an optical signal directly intensity-modulated by the electrical signal and then transmitting the optical signal from the plurality of sub-stations to the main station,
each of said plurality of sub-stations comprising:
an oscillator operable to output an additional signal,
a multiplexing portion operable to multiplex an electrical signal to be transmitted by the sub-station and the additional signal outputted from said oscillator,
a DC current source operable to output a DC bias current, and
a semiconductor laser operable to output an optical signal directly intensity modulated by a signal obtained by mixing a signal obtained by said multiplexing portion and the DC bias current outputted from said DC current source, wherein
said oscillator is operable to output the additional signal with a frequency which is higher than a frequency corresponding to a widest bandwidth of a frequency band allotted to the electrical signal to be transmitted and lower than a half of a lowest frequency of a frequency band allotted to the electrical signal to be transmitted.

26. The optical transmission system according to claim 25, wherein
each semiconductor laser of each of said plurality of sub-stations is a Fabry-Perot-type semiconductor laser.

27. The optical transmission system according to claim 26, wherein
a connection form between said main station and said plurality of sub-stations is a bus form.

28. The optical transmission system according to claim 27, wherein
each of said oscillators of each of said plurality of sub-stations is operable to output the additional signals with different frequencies than each other.

29. The optical transmission system according to claim 28, wherein
the additional signal outputted from each of said oscillators is modulated by any data.

30. The optical transmission system according to claim 29, wherein
said main station, in order to detect a failure of the system, further comprises:
an optical-electrical converting portion operable to convert the optical signal transmitted from said plurality of sub-stations into an electrical signal,
a separating portion operable to separate the electrical signal obtained by converting by said optical-electrical converting portion into the electrical signal to be transmitted and the additional signals, and
a signal detecting portion operable to detect from the additional signals obtained by separating by said separating portion the additional signal outputted from each of said oscillators of each of said plurality of sub-stations.

31. The optical transmission system according to claim 30, wherein
the electrical signal to be transmitted is a signal obtained by frequency-division-multiplexing one or more radio signal for mobile communications,
one or more contiguous frequency band are allotted to one or more electrical signals to be transmitted, and
each of said oscillators operable to output an additional signal with a frequency which is higher than a frequency corresponding to a bandwidth of a widest frequency band among the one or more contiguous frequency bands and lower than a half of a lowest frequency among the one or more contiguous frequency bands.

32. The optical transmission system according to claim 31, wherein
an electrical signal transmitted using at least one frequency band among the one or more contiguous frequency bands is a code division multiplex signal, and
each of said oscillators is operable to output an additional signal with a frequency which is higher than a frequency corresponding to a widest frequency band among all of the one or more contiguous frequency bands except the frequency band allotted to the code division multiplex signal and lower than a half of a lowest frequency of the one or more contiguous frequency bands.

33. The optical transmission system according to claim 30, wherein
each of said Fabry-Perot-type semiconductor lasers are selected from which central wavelengths of the optical signals outputted are separated at a previously set wavelength interval to each other.

34. The optical transmission system according to claim 33, wherein
the number of sub-stations connected to one optical fiber is 3 at the maximum.

35. The optical transmission system according to claim 31, wherein
each of said Fabry-Perot-type semiconductor lasers has such a chip structure that an active layer having an amplifying function of the optical signal and a spot size converting portion for narrowing an angle of emission of the outputted optical signal are formed on a same sub-strate.

36. The optical transmission system according to claim 35, each of said plurality of sub-stations further comprising an additional signal level adjusting portion operable to adjust a level of the additional signal outputted from each of said oscillators, wherein
said additional signal level adjusting portion is operable to adjust the level of the additional signal outputted from each of said oscillators so that a frequency modulation index $\beta$ of the optical signal outputted from each of said semiconductor lasers can satisfy a conditional equation $\beta<1/(2Q)$ for multiplying OBI noise by Q (where Q<1).

37. The optical transmission system according to claim 35, each of said plurality of sub-stations further comprising an additional signal level adjusting portion operable to adjust a level of the additional signal outputted from each of said oscillators, wherein
said additional signal level adjusting portion is operable to adjust the level of the additional signal outputted from each of said oscillators so that a frequency modulation index $\beta$ of the optical signal outputted from each of said semiconductor lasers can satisfy both of the conditional equation $\beta<1/(2Q)$ for multiplying OBI noise by Q (where Q<1) and a conditional equation $\beta \geq (2/\pi) \cdot 10^{P/10}$ (where $\pi$ is the ratio of the circumference of a circle to its diameter) for reducing noise or distortion which occurs in this optical transmission by at least P decibels.

38. The optical transmission system according to claim 37, wherein
said optical transmission path includes one or more optical fibers, and a position of an emission end surface of said Fabry-Perot-type semiconductor laser and that of an end surface of an optical fiber coupled thereto are set not to be parallel to each other.

39. The optical transmission system according to claim 37, wherein
when optical modulation indexes allotted to each of the plurality of the electrical signals to be transmitted and the additional signal obtained by level adjusting by each of said additional signal level adjusting portions are mi (i=1, 2, ..., N), a total optical modulation index $\sqrt{\{\Sigma(mi)^2\}}$ does not exceed 0.3.

40. The optical transmission system according to claim 31, wherein
each of said Fabry-Perot-type semiconductor lasers has such a chip structure that the active layer having an amplifying function of the optical signal is tapered.

41. The optical transmission system according to claim 40, each of said plurality of sub-stations further comprising an additional signal level adjusting portion operable to adjust a level of the additional signal outputted from each of said oscillators, wherein
said additional signal level adjusting portion is operable to adjust the level of the additional signal outputted from each of said oscillators so that a frequency modulation index $\beta$ of the optical signal outputted from each of said semiconductor lasers can satisfy a conditional equation $\beta<1/(2Q)$ for multiplying OBI noise by Q (where Q<1).

42. The optical transmission system according to claim 35, each of said plurality of sub-stations further comprising an additional signal level adjusting portion operable to adjust a level of the additional signal outputted from each of said oscillators, wherein
said additional signal level adjusting portion is operable to adjust the level of the additional signal outputted from said oscillator so that a frequency modulation index $\beta$ of the optical signal outputted from each of said semiconductor lasers can satisfy both of the conditional equation $\beta<1/(2Q)$ for multiplying OBI noise by Q (where Q<1) and a conditional equation $\beta \geq (2/\pi) - 10^{P/10}$ (where $\pi$ is the ratio of the circumference of a circle to its diameter) for reducing noise or distortion which occurs in this optical transmission by at least P decibels.

43. The optical transmission system according to claim 42, wherein
said optical transmission path includes one or more optical fibers, and a position of an emission end surface of said Fabry-Perot-type semiconductor laser and that of an end surface of an optical fiber coupled thereto are set not to be parallel to each other.

44. The optical transmission system according to claim 42, wherein
when optical modulation indexes allotted to each of the plurality of the electrical signals to be transmitted and the additional signal obtained by level adjusting by each of said additional signal level adjusting portions are mi (i=1, 2, ..., N), a total optical modulation index $\sqrt{\{\Sigma(mi)^2\}}$ does not exceed 0.3.

* * * * *

UNITED STATES PATENT AND TRADEMARK OFFICE
CERTIFICATE OF CORRECTION

PATENT NO. : 6,271,942 B1
DATED : August 7, 2001
INVENTOR(S) : Hiroyuki Sasai et al.

It is certified that error appears in the above-identified patent and that said Letters Patent is hereby corrected as shown below:

<u>Title page,</u>
Item [73] Assignees, please add the following assignee:
Matsushita Communication Industrial Co., Ltd.
Kanagawa-ken, Japan Signed and Sealed this Twentieth Day of November, 2001

*Attest:*

Nicholas P. Godici

NICHOLAS P. GODICI
*Attesting Officer*  *Acting Director of the United States Patent and Trademark Office*